United States Patent
Avetisov et al.

(10) Patent No.: US 10,601,828 B2
(45) Date of Patent: Mar. 24, 2020

(54) OUT-OF-BAND AUTHENTICATION BASED ON SECURE CHANNEL TO TRUSTED EXECUTION ENVIRONMENT ON CLIENT DEVICE

(71) Applicant: HYPR Corp., New York, NY (US)

(72) Inventors: George Avetisov, New York, NY (US); Bojan Simic, New York, NY (US); Roman Kadinsky, New York, NY (US)

(73) Assignee: HYPR CORP., New York, NY (US)

( * ) Notice: Subject to any disclaimer, the term of this patent is extended or adjusted under 35 U.S.C. 154(b) by 0 days.

(21) Appl. No.: 16/270,255

(22) Filed: Feb. 7, 2019

(65) Prior Publication Data

US 2020/0067922 A1 Feb. 27, 2020

Related U.S. Application Data

(60) Provisional application No. 62/720,609, filed on Aug. 21, 2018, provisional application No. 62/720,590, filed on Aug. 21, 2018.

(51) Int. Cl.
*H04L 29/06* (2006.01)
*H04L 9/08* (2006.01)
*G06F 21/45* (2013.01)

(52) U.S. Cl.
CPC .......... *H04L 63/0884* (2013.01); *G06F 21/45* (2013.01); *H04L 9/088* (2013.01); *H04L 63/18* (2013.01)

(58) Field of Classification Search
None
See application file for complete search history.

(56) References Cited

U.S. PATENT DOCUMENTS 8,495,715 B2 * 7/2013 Henderson .............. G06F 21/46
726/6
9,064,109 B2 * 6/2015 Smith ..................... G06F 21/45
(Continued)

OTHER PUBLICATIONS

Trusted Computing Group, "Trusted Computing Platform Alliance (TPCA): Main Specification Version 1.1b," https://trustedcomputing-group.org/wp-content/uploads/TCPA_Main_TCG_Architecture_v1_1b.pdf, 2003, 332 pages.

(Continued)

*Primary Examiner* — Maung T Lwin
(74) *Attorney, Agent, or Firm* — Pillsbury Winthrop Shaw Pittman, LLP

(57) ABSTRACT

Provided is a process that affords out-of-band authentication based on a secure channel to a trusted execution environment on a client device. The authentication process includes one or more authentication steps in addition to verifying any credentials provided by a client device. A notification may be transmitted by a server to a device other than the client device attempting to access the asset. That device may be a mobile device with a trusted execution environment storing user credential information, and the server may store representations of those credentials. The mobile device collects user input credentials and transmits representations for matching the previously stored representations and signed data for verification by the server that received data originated from the mobile device. The access attempt by the client is granted based in part on the result of authenticating the data received from the mobile device in a response to the notification.

21 Claims, 4 Drawing Sheets

(56) References Cited

U.S. PATENT DOCUMENTS

| | | | |
|---|---|---|---|
| 9,998,438 B2* | 6/2018 | Sinha | G06F 21/44 |
| 2003/0081774 A1 | 5/2003 | Lin et al. | |
| 2007/0014408 A1 | 1/2007 | Narendra et al. | |
| 2007/0016798 A1 | 1/2007 | Narendra et al. | |
| 2009/0199002 A1 | 8/2009 | Erickson | |
| 2010/0218233 A1* | 8/2010 | Henderson | G06F 21/46 726/1 |
| 2010/0235900 A1 | 9/2010 | Robinton et al. | |
| 2011/0138454 A1 | 6/2011 | Mansour | |
| 2012/0167170 A1 | 6/2012 | Shi et al. | |
| 2012/0167197 A1* | 6/2012 | Kruger | G06F 12/00 726/16 |
| 2013/0073859 A1 | 3/2013 | Carlson et al. | |
| 2014/0047521 A1* | 2/2014 | Henderson | G06F 21/46 726/6 |
| 2014/0259115 A1* | 9/2014 | Bakshi | H04L 9/3234 726/4 |
| 2014/0317686 A1 | 10/2014 | Vetillard | |
| 2015/0113618 A1* | 4/2015 | Sinha | G06F 21/44 726/6 |
| 2016/0127351 A1* | 5/2016 | Smith | G06F 21/316 726/10 |
| 2017/0177855 A1* | 6/2017 | Costa Faidella | G06F 21/45 |
| 2017/0230361 A1* | 8/2017 | Toth | H04L 63/08 |
| 2018/0173871 A1* | 6/2018 | Toth | G06F 21/45 |

OTHER PUBLICATIONS

Trusted Computing Group, "TPM Main: Part 1 Design Principles," Specification Version 1.2, Revision 94, https://trustedcomputinggroup.org/wp-content/uploads/Main-Part1-Rev94.pdf, Mar. 29, 2006, 178 pages.

Trusted Computing Group, "TPM Main: Part 2 TPM Structures," Specification Version 1.2, Level 2 Revision 94, https://trustedcomputinggroup.org/wp-content/uploads/TPM-main-1.2-Rev94-part-2.pdf, Mar. 29, 2006, 192 pages.

Trusted Computing Group, "TPM Main: Part 3 Commands," Specification Version 1.2, Level 2 Revision 94, https://trustedcomputinggroup.org/wp-content/uploads/TPM-main-1.2-Rev94-part-3.pdf, Mar. 29, 2006, 326 pages.

Trusted Computing Group, "TPM Main: Part 1 Design Principles," Specification Version 1.2, Revision 116, https://trustedcomputinggroup.org/wp-content/uploads/TPM-Main-Part-1-Design-Principles_v1.2_rev116_01032011.pdf, Mar. 1, 2011, 184 pages.

Trusted Computing Group, "TPM Main: Part 2 TPM Structures," Specification version 1.2, Level 2 Revision 116, https://trustedcomputinggroup.org/wp-content/uploads/TPM-Main-Part-2-TPM-Structures_v1.2_rev116_01032011.pdf, Mar. 1, 2011, 201 pages.

* cited by examiner

OUT-OF-BAND AUTHENTICATION BASED ON SECURE CHANNEL TO TRUSTED EXECUTION ENVIRONMENT ON CLIENT DEVICE

CROSS-REFERENCE TO RELATED APPLICATIONS

The present application claims the benefit of U.S. Provisional Patent Application 62/720,609 filed on 21 Aug. 2018, sharing the same title as this application; and claims the benefit of U.S. Provisional Patent Application 62/720,590 filed on 21 Aug. 2018, titled FEDERATED IDENTITY MANAGEMENT WITH DECENTRALIZED COMPUTING PLATFORMS; the entirety of each of which is incorporated herein by reference.

BACKGROUND

1. Field

The present disclosure relates generally to cybersecurity and, more specifically, to out-of-band authentication based on a secure channel to a trusted execution environment on a client computing device.

2. Description of the Related Art

In a variety of scenarios, it can be useful to authenticate a user via a different channel from that by which the user seeks to access resources requiring authentication. Examples include out-of-band authentication following a user's attempt to access a website by supplying a username and password to that website. Some authentication systems respond to a user's attempt to submit credentials in this manner by sending a push notification to a previously registered mobile device of the user, like a cell phone (distinct from the device upon which they seek access), and that push notification may prompt the mobile device to solicit additional credentials from the user. In this manner, such systems may supply additional factors by which additional confidence may be obtained regarding a user's identity, as merely compromising a user's username and password would not by itself afford access to secured resources.

Many existing out-of-band authentication techniques are potentially subject to vulnerabilities. Examples include attacks that compromise the client computing device by which the user supplies the supplemental credentials in the out-of-band channel. Some existing systems are potentially vulnerable to malicious code executing on the user's mobile device that, for example, capture user supplied credentials from system memory allocated to client-side authentication applications.

SUMMARY

The following is a non-exhaustive listing of some aspects of the present techniques. These and other aspects are described in the following disclosure.

Some aspects include a process executed by a computing device that supports a client-side role in out-of-band authentication based on a secure channel to a trusted execution environment on the computing device for a client-side authentication application. Some aspects of the process include: obtaining an authentication application within a memory of a computing device, and executing, by the computing device, the authentication application within a client execution environment of the computing device. The authentication application, when executed, is configured for establishing a secure session with a trusted execution environment of the computing device, the trusted execution environment comprising a secure memory not accessible from the client execution environment; requesting, by one or more requests over a secure session, establishment of a set of credentials corresponding to a user of the computing device within the secure memory by a co-processor of the trusted execution environment, the co-processor being a different processor from a central processing unit of the computing device; requesting, by one or more requests over a secure session, first data comprising a representation of each credential in the set of credentials, first signed data, and a signature key of the trusted execution environment; determining the co-processor of the trusted execution environment generated the representations responsive to the signature key; in response to the determination, transmitting the first data and first signed data to a server; identifying, within the memory on the computing device, a notification requesting authentication of the user of the computing device; in response to the notification, requesting, by one or more requests over a secure session, second data comprising a representation of a credential in the set of credentials and second signed data, wherein the second data and the second signed data are received dependent upon authentication of the user based on the credential stored within the secure memory by the co-processor; and transmitting the second data and the second signed data to the server.

Some aspects include a process executed by a processor of a server that supports a client-side role in out-of-band authentication based on a secure channel to a trusted execution environment on a first device different from a second device requesting access to a secure asset. Some aspects of the process include: registering the first device having a trusted execution environment by establishing a user record associated with a user permitted to access the secure asset, the user record comprising a user identifier associated with the user and establishing, in association with the user record, a device record for the first device in response to receiving, from the first device, a set of representations corresponding to a set of credentials stored within the trusted execution environment on the first device, device information including a device identifier of the first device, and a signature key corresponding to the trusted execution environment; receiving information corresponding to attempt to access the secure asset from the second device that comprises the user identifier and device information for the second device; accessing the user record based on the user identifier; selecting the device record for the first device associated with the user record based on the first device having a trusted execution environment; transmitting a notification to the first device based on the device identifier stored within the device record for the first device; receiving, from the first device, a response to the notification, the response including data comprising a representation of a credential in the set of representations corresponding to the set of credentials stored within the trusted execution environment on the first device and signed data; verifying the representation of the credential received in response to the notification matches the stored representation in the device record of the first device and the data was generated by the trusted execution environment based on the data, the signed data, and the signature key corresponding to the trusted execution environment; and transmitting, based on the verifying, an authentication result to grant the access attempt by the second device.

Some aspects include a tangible, non-transitory, machine-readable medium storing instructions that when executed by a data processing apparatus cause the data processing apparatus to perform operations including one or more of the above-mentioned processes.

Some aspects include a system, including: one or more computing devices with one or more processors; the one or more computing devices including at least one memory storing instructions that when executed by the processors cause the processors to effectuate operations including one or more of the above-mentioned processes.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
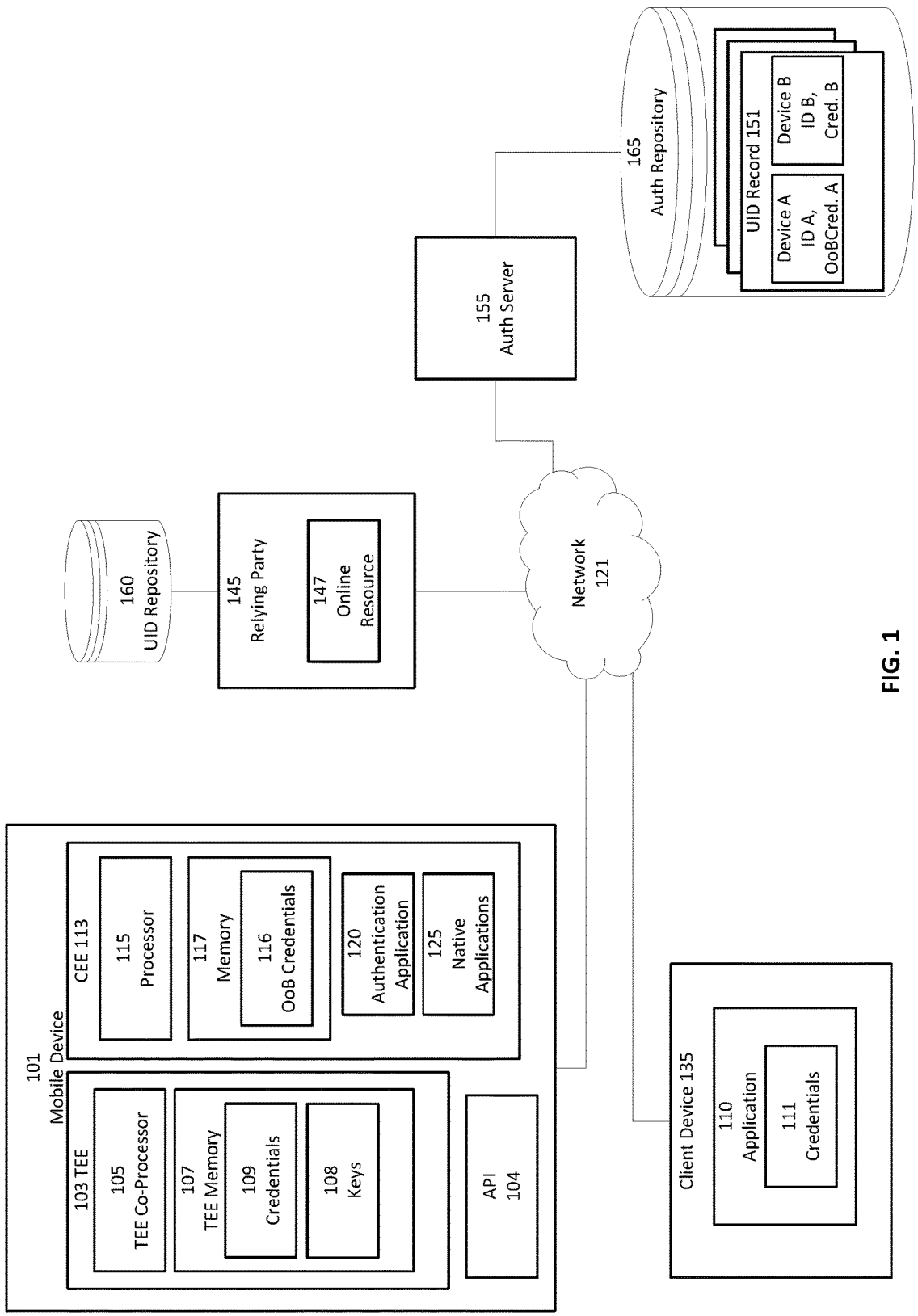
FIG. 1 is a block diagram showing an example of a computing environment by which the present techniques for user authentication may be implemented.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of cybersecurity. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some of the above-described issues with traditional out-of-band authentication techniques are mitigated by various embodiments described herein. Specifically, various embodiments described herein provide improvements in computer security that mitigate the capture of user supplied credentials from system memory allocated to client-side authentication applications, even in cases where the capture of such credentials is attempted by intercepting inter-process communication on the client device between the client-side authentication application and security infrastructure on the client device. Some embodiments described herein provide improvements in computer security that mitigate highly sophisticated methods for the capture of user supplied credentials, and some of embodiments incorporate use of and improve upon trusted execution environments, like Secure Enclave, ARM TrustZone, or various other trusted platform modules, like those compliant with ISO/IEC 11889 (the contents of which are hereby incorporated by reference), to provide enhanced client-side security. Moreover, the techniques described in relation to some of those embodiments for mitigating capture of user supplied credentials on client devices may be implemented in connection with various embodiments described herein to configure robust out-of-band authentication systems apt to prevent unauthorized access to secure assets, like protected data, programs, etc., even in instances where a malicious party has access to a device (or multiple devices) of an authorized party.

Embodiments may confer one or more of the aforementioned benefits or other benefits, some of which will be self evident to those of ordinary skill in the art and may remain unstated. Some embodiments may protect the credentials a user supplies in an out-of-band authentication exchange with zero knowledge techniques. For example, some embodiments may keep the out-of-band credentials on a mobile computing device, without those credentials leaving the mobile computing device (e.g., in plain-text or ciphertext form). In some embodiments, the credential, and cryptographic hash values based thereon, or various private cryptographic keys of asymmetric encryption protocols may be stored, for example exclusively, within a trusted execution environment, for instance, in a secure memory of a trusted execution environment implemented with a secure coprocessor that is separate (e.g., on different silicon, or in different logical blocks connected to different physical memory address spaces) from a central processing unit of the mobile computing device upon which an operating system and native applications of the mobile computing device execute. In some embodiments, the zero knowledge techniques may be applied to prevent even the central processing unit of the mobile computing device from accessing such credentials and keys. In some embodiments, a secure channel (or session) may be established between an authentication application executing on that central processing unit and the trusted execution environment. In some cases, the secure channel may impede attempts by threat actors to extract cryptographic keys or other credentials by impersonating the trusted execution environment or the authentication application in communications with one or the other of these computational entities. In addition, the secure channel may be implemented with a secure session, in that it may be closed (e.g., expire), such as after a predetermined number of communications between the trusted execution environment and the authentication application.

In some embodiments, the mobile computing device is a portable device (e.g., having a battery or other integrated power source) that a user frequently carries on or near their person throughout the course of their daily activities. Example mobile computing devices may be a smartphone or smartphone-like devices such as phablets, wearable computing devices, on-board computing devices of automobiles, or tablets with wireless data access.

Some embodiments may be implemented in a distributed physical architecture that includes client computing devices controlled by diverse entities (e.g., more than 10,000, or more than 100,000 different end users, each using a different pair of client devices). In some embodiments, users may operate client computing devices, like a laptop or desktop computer, which a user may use to log into an online account to access online resources. These may be referred to as "primary" devices to distinguish them from the secondary device by which out-of-band authentication is implemented during an authentication session. Other devices may also be suitable for this purpose, such as tablets, netbooks, and the like. A user may input credentials via the client computing device for the online account at a log-in page of a website via a browser or similar log-in interface within a native application. In turn, the client computing device may submit (e.g., in response to a user election to log-in) the credentials (which may be sent by submitting proof of possession of the credential, like cryptographic hash values based thereon) to a remote server, which may include an authentication system to authenticate user access to those online resources or engage an authentication system and receive a response authenticating user access to those online resources. The authentication system may verify whether the user inputs valid credentials, if those credentials are authenticated (i.e., verified as corresponding to the user-account of the user seeking access) the client computing device may be granted access to the online resources provided by the website or the native application. Conversely, if the user inputs invalid credentials, authentication fails (i.e., not verified) and the client computing device may be restricted from access to online resources provided by the website or the native application.

In some embodiments, that remote server engages an authentication service of an authentication system. For example, the remote server may transmit the credentials received from the client computing device to an authentication server. In turn, the authentication server, rather than the remote server, may authenticate the credentials, and provide the authentication result (e.g., verified or not verified) to the remote server. The remote server may then grants the client computing device access to the online resources or restrict the client computing device from access to the online resources. In some cases, the remote server and the authentication system communicate directly via an application program interface, or in some cases, the systems communicate via the client device, e.g., by passing parameters in query strings of redirect commands.

In some embodiments, the authentication process of an authentication session may occur when (e.g. in response to an event in which) the user attempts to access a native application, or more generally, a software asset. In other words, such assets may be secured, and access to those assets may be granted conditionally upon authentication of the user attempting to access the asset. A recent development in an era where network access, such as to the Internet, is prolific, digital rights management (DRM) techniques have been implemented to protect native applications, software assets, and other media from unauthorized access. DRM can include authentication checks that occur at time of access of an asset, periodically (e.g., every few minutes or hours while the asset is being accessed (e.g., read or executed), or continuously such as over a connection with a server while the asset is being accessed, sometime referred to as always-online. Authentication may protect an asset like a native application or feature thereof rather than (or in addition to) a specific online resource. Another example of an asset may be a media file. By way of example, a native application, like a native application for creating 3D models, may require user authentication upon launch (e.g., for a license) to access the application itself (which may require periodic re-authentication), or user authentication may be required for the native application to access an online resource (e.g., a repository of data), like a repository of 3D models. Sometimes both instances of authentication may be required. In either instance, a user may supply credentials (which may differ for each instance) and a remote server (or servers) may determine or receive an authentication result. In the case of the native application requiring user authentication (e.g., upon launch), a remote server may provide the result or data indicative of the result to the native application. In the case where user authentication is required for the native application to access an online resource, a remote server may grant the native application to access the online resource based on the result.

In some embodiments, the authentication process includes one or more authentication steps in addition to verifying the credentials received from the client computing device. Moreover, in some embodiments, the credentials received from the client computing device need only identify a particular user, account, or other entity. As such, the authentication process may not require any verifying of user credentials received from the client computing device. In either instance, based on the received credentials, a server may identify account information of a user associated with those credentials. In some embodiments, the received credentials include a user identifier operable to identify associated user account information.

User account information may include information about different computing devices used by the user (e.g., including a mobile computing device different from the client computing device attempting to access an online resource). The information about the different computing devices may include one or more identifiers for the respective computing devices, e.g., unique identifiers that distinguish the device from other computing devices and map to records in a push notification service like those mentioned below. Example of identifiers may include a network address identifier or a monitored address identifier. Example network address identifiers may include one or more of an IMEI number, telephone number, MAC and IP address, and/or other identifiers suitable to uniquely reference a given computing device. An example of a monitored address identifier may be a location (e.g., on a network) which a given computing device monitors for data published to that location and/or a key-value pair like a location and an identifier which a given computing device monitors for at that location. In some example embodiments, the monitored address identifier may be an address of a given computing device on a notification network or service, like a push notification network, to which the computing device has registered, e.g., without the sending party having access to an IP address or physical layer address of the recipient before causing the message to be sent, as such information may not be forthcoming in some mobile use cases where such addresses change frequently as the user moves through different areas. In turn, the given computing device may receive data published to that address on the notification service. In some embodiments, a monitored address identifier may be a network address identifier of the computing device.

One or more of the different computing devices, such as a mobile computing device, may have been previously registered with the server via an authentication application. For example, a mobile computing device may register with the server via an authentication application by downloading the application from the server or an application repository (or application store), executing the application, and performing one or more steps in a registration process. Obtaining the application may be performed by downloading and installing, or accessing an existing install without re-downloading and installing. The server may determine which ones of the different computing devices, such as those including the authentication application, are operable to receive a notification of the access attempt to the secure asset. The server may select one of the different computing devices registered with the server and cause a notification, such as a push notification, to be sent to the one of the different computing devices, like a mobile computing device registered as being associated with the user identifier. The server may send a notification such as a push notification over a service like via Firebase Cloud Messaging service, Apple's push notification service, Google Cloud Messaging, or another push notification service to which the different computing device is subscribed. Such messages may be relayed over other servers (e.g., other server systems) accessed via the Internet. An example of another notification service may be a notification service subscribed to by the authentication application on the different computing device, such as a feed, on which the server may push or otherwise transmit a notification. In either instance, the server transmits the notification such that one of the different computing devices may receive the notification. In some embodiments, an authentication server of an authentication system performs one or more of these steps in response to receiving credentials operable to identify associated user account information from a remote server. In some embodiments, an authentication service of an authentication system performed one or more of these steps in response to receiving credentials operable to identify associated user account information from the client computing device, such as by a redirection of the client computing device to the authentication server (e.g., by the remote server), or other configuration by which the client computing device may transmit credentials to the authentication server (e.g., via applet or other embedded content, such as within a log-in page, via application, etc.).

In some embodiments, the mobile computing device may execute an authentication application that includes an event handler configured to respond to such a push notification received from a server, such as an authentication server of an authentication system. The event handler of the authentication application may register with the operating system to receive such events and, in response to an event, interface with the mobile computing device to present, on the display, one or more user interface elements responsive to the notification. One or more of the user interface elements may be operable to solicit credentials from the user of the mobile computing device, or otherwise execute a process to solicit credentials. For example, the event handler/authentication application may request one or more native applications of the mobile computing device to present user interface elements configured to solicit the additional credentials via one or more interfaces of the mobile computing devices configured to obtain a corresponding credential input from the user. In some embodiments, the native applications selected to solicit credentials are configured to interface with a trusted execution environment of the client computing device, such that those credentials are obtained within the trusted execution environment. Alternatively, or in addition to interfacing with native applications, the authentication application may interface with the trusted execution environment of the mobile computing device to request solicitation of the additional credentials. In either instance, the user may be prompted to provide solicited credentials (or confirm a providing of the credentials) via one or more user interface elements or components and provided credentials may be obtained within the trusted execution environment when supplied by the user. For example, the user may then supply the additional credentials, like a password, Fast ID Online (FIDO) universal second factor (U2F) dongle near field communication (NFC) output, pin code, or biometric "print" measurement (like a fingerprint sensor reading, image sensor reading such as a faceprint (e.g., sensed with a time-of-flight sensor, structured light, or stereoscopic or light-field imaging), an iris reading such as an eyeprint, a voiceprint, or the like). The authentication application may obtain representations of the supplied credentials. In turn, the authentication application may transmit the additional credentials obtained from the user to the authentication server of the authentication system.

Thus, for example, access to the online resources (or other asset like a native application) from the computing device may be granted by virtue the different computing device authenticating with the additional credentials. In practice, for non-nefarious access requests, the user of the computing device is typically the same user as the one requesting access to the online resource with the different computing device, and the supplying of the additional credentials verifies both the user's intent and identity to access the online resources (e.g., such as where access to the online resources is controlled on a per-individual user basis). Other and/or additional factors may also be considered, examples of which are explained in detail below.

Before or after user input to supply a credential via a mobile device (or other device different from a client computing device requesting access to an online resource), an authentication application may establish a secure channel with a trusted execution environment on the mobile computing device using the techniques described below. The secure channel may be established during a lifetime of a secure session between the authentication application and the trusted execution environment. Should the session expire, such as after a predetermined number of requests and/or response or threshold amount of time has elapsed, a new session may be established to permit communication by secure channel. Supplied credential values, e.g., a cryptographic hash value based thereon, may be obtained (e.g., accessed or computed) within the trusted execution environment. Representations of those credentials (e.g., representations that demonstrate proof of possession of the credential, like a cryptographic signature that indicates proof of possession of a private key in an asymmetric protocol or a cryptographic hash value that demonstrates possession of a cryptographic key in a symmetric protocol) may be generated (e.g., within the trusted execution environment and may be passed through the secure channel to the authentication application. In some embodiments, the trusted execution environment may determine whether supplied credential values match previously obtained credential values stored within the trusted execution environment. For example, the trusted execution environment may determine whether supplied credentials values or a cryptographic hash value corresponding to supplied credential values match a valid credential stored within the trusted execution environment. The valid credentials stored within the trusted execution environment may have been generated during a prior registration process by the authentication application, and representations of the valid credentials may have been provided to the authentication application for transmission to an authentication service during the prior registration process. Representations of valid credentials may be a cryptographic hash or encrypted version of valid credentials or valid credentials and some other value, even though valid credentials may also be cryptographically hashed or encrypted themselves. Only representations may be passed outside of the trusted execution environment such that valid credentials need not be altered to generate new representations (e.g., by changing a encryption key or changing a value operable to alter cryptographic hash output values).

Results may be cryptographically signed with a private encryption key held within the trusted execution environment (e.g., not accessible in the memory address space of the operating system of the mobile computing device in which the authentication and native applications execute, and in some cases not accessible on a memory bus of the central processing unit of the mobile computing device), for instance, in memory outside a physical memory address space defined by a memory bus coupled to a memory controller integrated with the CPU of the mobile device. For example, some embodiments may cryptographically sign (e.g., in the trusted execution environment) various outputs of the trusted execution environment used for authentication (e.g., verification and matching by an authentication system). Example outputs may be one or more of a verification results as determined by the mobile device, a representation of a credential value, and/or other information described herein. For signed data (e.g., a signature of the data using a key, like a private key), the signature may be verified based on the input data and a corresponding key (e.g., the public key corresponding to the private key).

In some embodiments, a server is configured to receive the cryptographically signed data, verify that the cryptographically signed data was signed by an entity (e.g., a specific mobile computing device of a user) with access to a private cryptographic key corresponding to a public cryptographic key associated with the user's account (e.g., demonstrate that the received value demonstrates possession of a secret value), and then, determine whether the signed data indicates that the user-supplied credential matches that previously supplied during registration. For instance, a server may recompute a cryptographic hash of a shared secret value and confirm that it matches the received value. The server may verify that user-supplied credentials match (e.g., in the sense that they demonstrate possession of the same secret) those previously supplied during registration where the data is a representation of the user-supplied credential. In some embodiments, a different cryptographic key pair in an asymmetric encryption protocol (e.g., Diffie-Hellman, Digital Signature Standard, ElGamal, RSA, etc.), may be applied for each of a plurality of different credentials to generate representations, such as a plurality of different biometric measurements, required by a policy applied in a given authentication process. Alternatively, or additionally, different representations may be generated using different inputs to a cryptographic hashing function (e.g., SHA-256, SHA-512, BLAKE2, etc.) to demonstrate possession of the credential values without revealing their content. Some embodiments may implement a hybrid cryptographic protocol by which a shared secret is established with asymmetric encryption and then the shared secret is used in a symmetric encryption protocol. In configurations that use credential-specific keys (e.g., the client may have multiple credentials for different online resources, and each credential may have a different associated key), embodiments may mitigate key distribution issues that arise when an entity (e.g., a company) disables a particular type of credential for accessing an online resource or asset while leaving the others in place. Representations may also be generated in different ways for different ones of parties utilizing an authentication system. Thus, for example, a set of credentials used for a company A may have different representative values than when that same set of credentials are used for a company B. Additionally, in some embodiments, different key may be used for the same credential, e.g., as backups or one-time keys. In some embodiments, an authentication server of an authentication system performs one or more of these steps in response to receiving credentials from a remote server (a term which is used herein to refer to a remote server-side application that may be implemented on one or more computing devices, e.g., in a micro-services architecture, or a monolithic server-side application).

FIG. 1 illustrates an example computing environment 100 within which an out-of-band authentication system with a client-side role in out-of-band authentication may be implemented. In some embodiments, the computing environment 100 may include a mobile device 101, a client device 135 (e.g. a primary device in a device pair used in an authentication session by the user), a relaying party computing system 145, and an authentication server 155. These components may communicate with one another via a network 121, such as the Internet and various other local area networks. In addition, embodiments of the example computing environment 100 may include a mobile computing client device, such as mobile device 101, that supports client-side out-of-band authentication based on a secure channel to a trusted execution environment.

In some embodiments, the techniques described herein may be implemented within the computing environment 100 (e.g., including each of the illustrated components) shown in FIG. 1 by executing processes described below with reference to FIGS. 2 and 3 upon computing devices like those described below with reference to FIG. 4. In some embodiments, computing devices like those described with reference to FIG. 4 may include additional and/or other components specific to configurations discussed herein. For example, a mobile computing device 101 may include components similar to those described with reference to FIG. 4 that support the client execution environment 113 and additional components supporting a trusted execution environment 103, which may include a subset of like components (e.g., processor, memory, bus, etc.) configured to perform operations of the trusted execution environment. Similarly, client devices 135, server 145, 155, and repositories 160, 165 may include some additional and/or other components than those illustrated in FIG. 4. However, each of these devices may operate in accordance with principles similar to those discussed below and with reference to FIG. 4, such as by loading instructions and other data into a memory and executing those instructions by a processor to perform various operations.

One pair of mobile device and client device is shown, but embodiments are expected to include substantially more, e.g., more than 10 or more than 100 concurrently participating in authentication sessions. The mobile device 101 may be a mobile computing client device to which a user has access to and may utilize to authenticate a request to access a secure asset like online resources. Notably, as is often the case, the request to access online resources may not originate from the mobile device 101. Rather, the mobile device 101 serves a client-side role in an out-of-band authentication process for that request to access online resources. By way of example, the request to access online resources may originate from a different client device, such as client device 135. A common context for the above scenario might include an employee using a work or personal computer (e.g., a laptop or desktop computer), represented by client device 135, to request access to online resources (e.g., a web application) hosted on a server by their employer, and using a work or personal mobile device (e.g., a smartphone or tablet), represented by mobile device 101, to provide data utilized to authenticate the request to access the online resources.

Accordingly, while the mobile device 101 may be any client device, the mobile device may optionally include a trusted execution environment which, in some cases, may be an external, portable device capable of being coupled via a bus, like USB, to any client device including a suitable interface. Example devices including highly portable smartphones and tablet type devices carried by users during their day-to-day activities are common representative embodiments. Moreover, smartphone and tablet type devices, given their portability, are more likely to include integration of trusted execution environments for purposes beyond out-of-band authentication, such as for secure payments, digital currency wallets, and the like. The above should not be construed to rule out other portable mobile computing devices, such as wearables, like watches or bracelets, that as they become more prevalent may be as equally suited as a smartphone or tablet device to collect credentials from users. For example, some of those wearable devices are operable to collect different user credential inputs which may be utilized for authentication processes. In fact, devices such as wearables, may be suitable to reduce intrusion on users while providing robust out-of-band authentication.

Generally, embodiments of a trusted execution environment 103 may include any isolated execution environment, which may run in parallel (e.g., concurrently with) with a client execution environment 113 (CEE), e.g., a process executed in the context of the OS and having a distinct virtual address space assigned within the physical address space of the memory to which the CPU is connected via a memory bus. Compared to a user-facing client execution environment 113, which may execute the mobile device operating system and most user-facing mobile applications, the trusted execution environment 103 is expected to be more secure and may execute a subset of specific applications (e.g., applications, services, and/or software modules) on the mobile device, like trusted applications or modules for authentication operations, which may include user authentication, payments, digital rights management, and the like. Some of those authentication operations may be performed in an out-of-band (e.g., external to a channel by which the primary computing device requests authentication) authentication process, such as for granting user access to online resources and other assets, payments, digital rights management, and the like. Additionally, the trusted execution environment 103 may store within and/or cryptographically sign data associated with those applications or modules within the trusted execution environment, such as to protect the data from being tampered with, read, and/or modified by an unauthorized entity.

In some embodiments, the trusted execution environment 103 may perform one or more operations responsive to requests received at an interface by which one or more applications within a user-facing client execution environment 113 may request data from and/or provide data to the trusted execution environment, such as to utilize one or more of the modules within the trusted execution environment 103 for authentication operations. Thus, in some embodiments, a client execution environment 113 may include an application programming interface (API) by which those requests are communicated from the CEE 113 to the TEE 103, and responses thereto are communicated from the TEE 103 to the CEE 113. In some embodiments, the TEE 103 may include an API like that above for facilitating the above communication of data, or may additionally include another API (e.g., in addition to either aforementioned API) or secure operating system for facilitating communication of data between elements within the TEE 103. Thus, for example, once the TEE 103 receives a request or other data for processing, that data can be processed exclusively within the TEE. The structure of the trusted execution environment 103 may be logical, implemented in hardware, or a mix of both.

Some embodiments of the trusted execution environment 103 may include a TEE co-processor 105 and TEE memory 107, which may be physically separate from the processor 115 and memory 117 of the client execution environment. For example, some implementation of the TEE memory 107 may include a physically distinct memory address bus from the main processor 115, but which is coupled to the TEE co-processor 105 to support secure communications between them. This is not to suggest that both the co-processor 105/processor 115 and/or TEE memory 107/memory 117 may not be incorporated in a same package or die or that the co-processor 105 and/or TEE memory 107 cannot make use of at least some or all of the capabilities of the processor 115 and/or memory 117 in a secure fashion. In some examples, embodiments of the trusted execution environment 103 may include a TEE co-processor 105 and/or TEE memory 107 which can be physically separate from but have available the full processing power of the processor 115 and/or memory 117 of the client execution environment 113. In some embodiments, the TEE co-processor 105 and/or TEE memory 107 are partially or wholly logically separate, such as by way of a reserved or additional processing core and/or reserved address space. For example, embodiments of the trusted execution environment 103 may include a TEE co-processor 105 and/or TEE memory 107, which are logically separated from the processor 115 and memory 117 of the client execution environment, such as by cryptographic isolation of one or more processes, threads, processing cores, and/or address space, or as secure elements within respective components. Within the trusted execution environment 103, the different trusted applications or modules may also be isolated from one another, such as by cryptographic isolation or other software isolation techniques.

Oftentimes, the trusted execution environment 103 includes at least one keyed hardware component. Keyed hardware components can include a unique cryptographic key or keys for isolating trusted applications and/or data within the trusted execution environment or to otherwise prevent tampering from the client execution environment 113 or other entity. Keyed hardware components can be substantially tamperproof. For example, the design of the keyed hardware component can be immune to software attacks, and an attacker might have to go to exceptional lengths in physically examining the keyed hardware component (e.g., with highly specialized tools) to even possibly be able to read the key. In some cases, the key may even be stored in a memory configured such that attempts to read the key of the hardware component is destructive to the memory (e.g., causes stored values to change or the memory to change stored values). Thus, under even the most extreme of circumstances, the keyed hardware components can be configured to prevent divulging of their key or keys.

In some embodiments, one or more components operable to solicit credentials from a user may be configured to communicate with the TEE co-processor 105 and/or memory 117 in ways similar to those described above to provide enhanced security. For example, one or more of the components operable to solicit credentials may be logically and/or physically isolated from the CEE 113 to support secure communications with the TEE 103. For example, one or more of those components may be physically isolated by couplings through a system bus different from a main system bus. The isolation may also be logical, such as by cryptographic isolation, which may utilize keys associated with those hardware components operable to solicit credentials. Accordingly, data communications by one or more of those components that is secured by one or more cryptographic keys may, in some configurations, logically flow through and/or be accessible from the CEE 113 and still be considered isolated as the TEE 103 securely stores a key operable to decrypt the data and that key is not accessible by the CEE 113. As an example, the memory 117 of the TEE 103 may securely store one or more keys operable to decrypt information received from the respective components. In some cases, isolation of one or more components may only be partial, such as where the component also serves a function with the CEE 113. For example, a given component may communicate securely via a separate system bus, cryptographic isolation, or in another secure way (e.g., on a request/response path between the TEE and component) described herein for communications pertaining to the TEE 103 and in an unsecured fashion via a main system bus and/or without encryption for communications pertaining to the CEE 113.

In some embodiments, the trusted execution environment 103, with the TEE co-processor 105, may execute a process to generate or otherwise store one or more encryption keys 108, which may include one or more keys from a key-pair, such as a pairing of a private encryption key and a public encryption key. One or more generated keys 108, such as generated private keys, may be protected within the trusted execution environment, such as within the TEE memory 107. For example, generated private keys may be isolated from trusted applications within the trusted execution environment by cryptographic isolation. In some embodiments, generated private keys may be encrypted (e.g., for storage) based a cryptographic key of a hardware component, such as a key of one of the TEE co-processor 105 or component associated with the TEE co-processor 104, so that only the TEE co-processor 105 can utilize a generated private key. For example, a process of the TEE co-processor 105 may access an encrypted version of the generated private key stored within the TEE memory 107 and then decrypt the encrypted version of the generated private key based on a cryptographic key of the hardware component prior to another process utilizing the private key). In this way, a generated private key may be afforded a substantially similar degree of security as that of a cryptograph key of the hardware component. In other words, a malicious actor must cause the hardware component to divulge a key for decrypting an encrypted version of the generated private key prior to being able to use the generated private key (e.g., for a signature). Similarly, the TEE co-processor 105 may encrypt other data stored within the trusted execution environment, either with a generated key, received key, a cryptographic key of a hardware component, or combination thereof. Likewise, the TEE co-processor 105 may decrypt other data, such by decrypting that data with a generated key, received key, a cryptographic key of a hardware component, or combination thereof (such as in instances where some data is encrypted based on a generated private key and stored subsequent to further encryption based on a cryptographic key of a hardware component).

In some embodiments, the TEE 103 may be configured to isolate different data within the TEE 103. For example, some embodiments of the TEE 103 may encrypt different data (e.g., different keys or other data associated with different applications or modules) based on a function that takes as input a cryptographic key, such as a key 108 in TEE memory 107, (which may be a generated key, hardware key, or other stored key) and a value that is altered for the different data. Alternatively, the cryptographic key itself may differ for different data, for example, a function may take as input a cryptographic key of a hardware component and a value that is altered to generate different cryptographic keys for different data. In turn, a function may utilize different cryptographic keys to encrypt different data within the TEE 103. The value that is altered may be altered deterministically (an operation referred to as incrementing or decrementing herein, depending on the direction in which alterations occur along a deterministic sequence), selected deterministically, generated randomly, output from a linear shift register, or by other method, and the alteration of the value ensures that one module or application within the TEE 103 cannot utilize a key or data stored within the TEE memory 107 to which it is not authorized.

In contrast to a generated private key of a key pair, which may be maintained solely within the trusted execution environment 103, a public key of the key pair may be shared by the trusted execution environment 103 with the client execution environment 113. Elements outside the trusted execution environment 103 may utilize the public key of the key pair to encrypt data, which can then only be decrypted with the private key stored within the TEE 103. Similarly, the TEE may sign results or other data output with a function utilizing a private key of a key pair, stored within the TEE 103, and an element outside the TEE 103 may utilize a disseminated public key of the key pair to verify the signature, and thus verify that the result or other data output was generated by the TEE 103. Thus, for example, the trusted execution environment 103 may execute a process to sign some data with a private encryption key, and a disseminated public encryption key can used to verify that the trusted execution environment 103 signed the data. In the context of authentication, the data may be a credential value or a cryptographic hash value of the credential value and representative of a user authenticating a request to access online resources.

In some embodiments, the TEE 103 and CEE 113 communicate information by way of one or more application programming interfaces, such as an API 104. Some embodiments of the API 104 are implemented in or by firmware stored to non-volatile memory of the mobile device 101, which can sometimes be a memory space separate from the TEE Memory 107 and/or Memory 117 and specify underlying functions available to the CEE 113 for communicating with the TEE 103 (e.g., like a Basic Input/Output System "BIOS"). Some embodiments of the API 104 may include one or more drivers to facilitate communications with hardware components, such as of the CEE 113 and/or TEE 103. In some embodiments, the API 104 and drivers may be considered separate, but may be layered, like in a stack, whereby the API 104 provides higher level functions and the drivers facilitate operations associated with those functions. Different configurations may include the example API 104 or other elements supporting API functionality, like drivers, in different locations. Some embodiments may include the API 104 within the CEE 113, within the TEE 103, within an element having a physical interface with the TEE 103 and/or CEE 113, in firmware of the mobile device 101 (e.g., in a BIOS), or combination thereof. Some embodiments of the TEE 103 may include a monitor to monitor a system bus for requests from an API 104 (or driver). Oftentimes, the location of the API 104, drivers, and/or other elements depends on the physical and/or logical structure of the TEE and CEE, which can vary between different implementations. However, regardless of the specific implementation, an API 104 may be configured to provide an interface by which at least some data or results determined within the TEE 103 may be passed to the CEE 113 and by which at least some functions performed within the TEE 103 may be requested by the CEE 113. Further, requests for at least some of those functions may include data or arguments for performing at least some of those functions on the data.

An example API, such as API 104, may be configured to receive requests from elements (e.g., a given application, module or interface) within the CEE 113 and communicate those requests to an appropriate element (e.g., a given application, module, or interface) within the TEE 103. In some embodiments, the API 104 translates a received request from a schema compatible with the CEE 113 to a schema compatible with the TEE 103. In some cases, that may include translating a request in one schema into multiple lower-level requests in another schema. In some embodiments, the API 104 may communicate one or more requests in a schema compatible with the TEE 103 over a system bus, which the TEE 103 may include an interface or monitor to detect those requests for processing within the TEE 103. Example requests may include a request to generate a cryptographic key or key pair, solicit credentials, verify credentials, or otherwise perform a function provided within the TEE 103, such as the various operations of the TEE described herein. In turn, one or more elements within the TEE 103 may process a request and optionally return a result of processing the request to the API 104. In some embodiments, the TEE 103 processes a received request in a schema compatible with the TEE 103 and returns result according to that schema. For example, the TEE 103 may include an interface or monitor to provide results back to the API 104, such as over a system bus. The API 104 may translate results received from the TEE 103 into a schema compatible with the CEE 113. In some cases, that may include receiving multiple results from the TEE 103, some of which may be utilized in subsequent requests to the TEE 103, prior to returning a result in a schema compatible with the CEE 113 in response to a request received from the CEE. The API 104, in turn, may communicate a result to an element having initiated a request or other specified element.

In some embodiments, one or more elements within the TEE 103 may communicate with one or more elements within the CEE 113 via the API 104 over a secure channel. In some embodiments, the secure channel substantially protects communication sessions between the authentication application 120 and the TEE 103. More specifically, a secure channel prevents other applications, like native applications 125, from accessing data communicated between the authentication application 120 and the TEE 103 in a communication session. In some embodiments, different ones of the native applications 125 may also communication with the TEE 103 over a secure channel such that other applications cannot access the communicated data. In some embodiments, the secure channel extends to communication sessions within the TEE 103. For example, the secure channel may protect communications between a trusted application or module within the TEE 103 and the API 104 such that other trusted applications or modules within the TEE 103 are prevented from accessing data communicated between the authentication application 120 and the trusted application or module which the communication session was established via the API 104.

Cryptographic systems (like those discussed above for encrypting data) generally rely on cryptographic algorithms based on mathematic problems for which there currently exist no efficient solution. The use of asymmetric encryption algorithms, like those utilizing key exchanges, can afford secure communications without requiring a secure channel. One example of such an asymmetric encryption algorithm generates a key-pair for an entity, where a first key of the key-pair is a private key (e.g., held securely by the entity) operable to decrypt data encrypted with a second key of the key-pair and the second key is a public key made available to other entities for encrypting data to be transmitted to the entity having the private key. However, such asymmetric encryption algorithms are computationally intensive and inefficient for high frequency communications and/or communications of increasing data size. Thus, in many instances, it is preferable to communicate securely, but also efficiently, such as over a secure channel, using symmetric encryption algorithms that are less computationally intensive than asymmetric ones. The secure channel may be initiated utilizing asymmetric encryption to encrypt and pass an identifier or session key that may subsequently be used as a symmetric key or basis therefor in asymmetric encryption algorithms. In some embodiments, an asymmetric key, like a public key, may be used to encrypt an identifier (e.g., by a first entity). The encrypted identifier, in turn, can be decrypted with a private key (e.g., by a second entity) corresponding to the public key and the second entity may return a secure channel to the first entity for a communication session utilizing a shared (e.g., symmetric) encryption key. Additionally, the secure channel may be bound to the identifier such that keys or data created in sessions over the secure channel are not accessible from other application sessions.

In addition to the trusted execution environment 103, the mobile device 101 includes a client execution environment 113. The client execution environment 113 may include a processor 115 and memory 117 configured to perform operations within the client execution environment. For example, the client execution environment 113 may include an operating system (not shown) and one or more applications. Some of the applications may be native applications 125, which generally, are developed for use on a particular platform or device, such as the mobile device 101. Thus, for example, a native application 125 may be loaded into memory 117 and executed by the processor 115 within the client execution environment 113.

One or more of these native applications 125 may be configured to provide services such as notification services, and optionally generate elements within a user interface on the mobile device 101 in response to the receipt of a notification. In addition, some of these native applications 125 may detect, collect, or otherwise support user inputs, such as a selection of a user interface element, and cause an operation corresponding to the selection. In some cases, a native application 125 may prompt the user to provide a specific input in response to the receipt of a notification. In other cases, a native application 125 may evaluate continuously provided inputs (such as from a biometric sensor) in response to the receipt of a notification. In some example embodiments, a native application 125 may evaluate, prompt, or otherwise obtain multiple different user inputs. In either case, example native applications 125 may interface with (or provide an interface on) one or more different components of the mobile device 101 or communicatively coupled devices, such as fingerprint sensors, image sensors, display of software and/or interface with hardware keyboards, etc. as well as other types of components and/or biometric sensor devices operable to obtain corresponding user input types. In some embodiments, the TEE 103 may interface via an API with such native applications 135 to securely collect input credentials.

Examples of user input can include selection of one or more characters or digits on a keyboard (e.g., displayed within an interface on a screen of the device or coupled to the device) and receipt of selected characters or digits, which may correspond to a personal identification number, password, or other keyed input. Other similar examples may include input/selection of a pattern or other combination of user interface elements on a screen. Further examples of user input can include selection of a user interface element to capture an external input indicated by the element, such as inputs pertaining to the user, which may include image data from an image sensor or other sensor, like a finger print sensor, or other biometric sensor operable to collect biometric input pertaining to the user when the user interacts with the sensor. User input may not be explicit, but rather involve detection of and capturing the input, such as by requesting the user position their face or component performing facial recognition in a position that enables capture of the input. In some embodiments, a native application 125 may communicate with one or more external devices to capture external input, like a wearable device comprising one or more biometric sensors operable to collect biometric input pertaining to the user when the user interacts with the sensor. In some embodiments, some types of biometric input (e.g., heart rhythm, blood pressure, body temperature, etc.) may be evaluated on a continual basis or for a trailing duration of time from a current time of notification where those biometric inputs may be individually or a collection thereof indicative of a particular user after a sufficient period of time; and other types of biometric input (e.g., facial image, fingerprint, eyeprint, etc.) may be evaluated upon receiving particular sensor input requested from the user that are indicative of a particular user at time of collection.

Some example native applications 125 may interface, via the API 104, with the TEE 103 to securely collect and subsequently store, in the TEE 103, various ones of valid representations of user credentials 109 for authenticating user input received from the various ones of the native applications. In some embodiments, the secure collection includes one or more secure communications between the TEE 103 and a component operable to collect the credential, and that process may be initiated by a native application 125 through a request to the API 104. In turn, a user may establish valid representations of different user credentials 109 when setting up their mobile device 101 upon purchase, activation, or update thereof, such as by inputting a password, setting up a faceprint, fingerprint, eyeprint, etc. or otherwise setting up or permitting different types of credentials for protecting data on the mobile device 101. In many cases, an operating system of the mobile device 101 or various ones of the native applications 125 request that a user input various credentials during set-up the device or upon installation or use of the application. Accordingly, one or more valid representations of user credentials 109 may be established and/or updated within the TEE 103. As described above, the user credentials 109 as they pertain to different applications may be isolated within the TEE 103. Thus, storage of a valid credential may be specific to a given application (e.g., by encryption with a key different from other keys for other applications), even where the credential itself may be the same for some other applications.

Similarly, a native application 125 and/or operating system of the mobile device 101 may interface, via the API 104, with the TEE 103 to securely authenticate a user based on the user providing input that matches a valid representation of a corresponding credential 109. In some embodiments, the authentication includes one or more secure communications between the TEE 103 and a component operable to collect the credential to receive user input for the credential within the TEE, and that process may be initiated by a native application 125 through a request to the API 104. The received user input may be processed within the TEE 103 for a comparison to a valid representation of the corresponding credential 109 and the native application 125, via the API 104, may receive a result indicating whether the user was authenticated based on the user input. As described above, the user credentials 109 as they pertain to different applications may be isolated within the TEE 103. Thus, authentication of user input with a valid credential may be specific to a given application (e.g., by encryption with a key different from other keys for other applications), even where the credential itself may be the same for some other applications.

In some embodiments, use of one or more of those credentials may be subject to policies implemented by an authorization server 155 providing authentication services and/or relying party 145 providing access to secured assets, such as online resources, subject to authentication by the authentication service. For example, the authentication server 155 and/or relying party 145 may accept or deny use of the different ones of the user credentials 109 or specify requirements for acceptance of different ones of the user credentials 109 for authentication for different secure assets. As an example, passwords not meeting certain criteria (e.g., length, randomness, number of unique characters, etc.) specified by a policy to access a given secure asset may be denied. As a result, the user may choose to establish new credentials 109 meeting the policy or a different credential 109 (e.g., of a different type) that meets criteria of the policy may be utilized. In another specific example, a policy for accessing a given secure asset may dictate that facial recognition credentials may be denied for a subset of mobile device 101 models, brands, or operating systems that are determined to provide insufficient results in securing the device against attack methods (e.g., are easily thwarted by a printed picture or model of a user's face). As a result, for users of devices belonging to that subset of mobile devices, different credentials 109 that meet criteria of the policy may be utilized.

In some embodiments, an example native application 125 provides a native notification service configured to post or store received notifications (e.g., to a location in memory 117) such that other applications may detect receipt of a notification to which that application pertains. For example, a native notification application may post a received notification (e.g., in a location in memory) such that an authentication application 120 may automatically detect and subsequently access the notification. The native application may generate a user interface element alerting the user of receipt of the notification. In turn, selection of the user interface element may call or launch the authentication application 120, which may then access the notification. Alternatively, the authentication application 120 may detect or otherwise receive the notification and generate a user interface element alerting the user of receipt of the notification. Specific implementation may vary depending on mobile device 101 capabilities, such as by operating system version or type, available notification services, and the like.

In some embodiments, a native application 125 providing a notification service, such as Firebase Cloud Messaging service, Apple's push notification service, Google Cloud Messaging, etc., may receive a notification on the service, such as push notification, and post the notification to a location in memory 117. One or more other applications (either within the client execution environment 113 or the trusted execution environment 103) may monitor that location in memory 117 for posted notifications. The one or more applications may be configured to identify posted notification to which they pertain, and in turn, perform one or more actions in response to the notification and any data which the notification includes. In some embodiments, a notification service posts notifications for different ones of the applications to different locations in memory 117, such as to different locations specified for the different ones of the applications or different locations specified by the different ones of the applications. In some embodiments, a notification service, in response to receiving a notification, passes the notification or a location in memory 117 of the notification to the application to which the notification pertains.

In some embodiments, a native application 125, like an authentication application 120, may include a module, like an event handler, configured to provide notification service capability when executed on the mobile device 101. In some embodiments, the module may be provided separately, such as in a lightweight companion application to the authentication application 120, depending on the configuration on the client execution environment 113. In either instance, the module may be configured to provide notification service capability when loaded into memory 117 and executed by the processor 115 as a background service or process within the client execution environment 113. In turn, the module configured to provide notification service capability may receive notifications from the network 121 by subscription of the module and/or mobile device 101 to a notification service. For example, the module may monitor a port of the mobile device 101 configured to receive data from the network 121 and identify notifications received at the port, such as based on header information (e.g., sender/recipient information) of one or more data packets containing notification data. In response to identifying a notification, the module may post the notification to a location in memory 117 or otherwise provide the notification to the authentication application 120 by a process like one of the processes described above in terms of a native notification service. Similarly, a native notification service may monitor a port of the mobile device 101 to identify notifications received at the port from the network in a fashion similar to that described above.

Different embodiments may rely on one or more of the different example notification service implementations described herein. For example, in some embodiments, a native notification service executing on the mobile device 101 may receive a push notification pertaining to the authentication application 120 on a notification service to which the mobile device 101 and/or notification service are subscribed and post the push notification to a location in memory 117. The authentication application 120 may monitor the location in memory 117 for posted notifications that pertain to the authentication application and, in turn, access the push notification posted by the notification service. In some embodiments, the authentication application 120 includes a module configured to monitor for posted notifications. In some embodiments, the module may be provided separately, such as in a lightweight companion application to the authentication application 120, depending on the configuration on the client execution environment 113. In either instance, the module may be configured to monitor for posted notifications pertaining to the authentication application 120 when the module is loaded into memory 117 and executed by the processor 115 as a background service or process within the client execution environment 113. In another example, in some embodiments, the native notification service may receive a push notification pertaining to the authentication application 120 on a notification service to which the mobile device 101 and/or notification service are subscribed and pass the notification, or information indicative of a location in memory 117 thereof, to the authentication application 120. The authentication application 120, in turn, may receive the notification or retrieve the notification.

Depending on the embodiment, the mobile device 101 may receive push notifications pertaining to an authentication application 120 following one or more of a user's attempt to access a secure asset. For example, a user may attempt to access (e.g., log on to) an internal website by supplying a username (and optionally a password) to that website, access an online or installed application with another device, make a payment with a credit card or other means, attempt a firmware/software update (e.g., code signing), access other accounts and resources (e.g., consumer across banking, finance, shared credential use, etc.), access shared employee solutions like payment portals, stock or other market trading, etc., download a secured file or other data, open a secured program or file therewith, and the like. More generally, a push notification pertaining to the authentication application 120 may be received by the mobile device 101 following a user's attempt to access or modify a secured asset (e.g., an online resource) via a client computing device. Often, such access attempts are performed with a client computing device other than the mobile device 101 and, as such, the notification causes authentication application 120 to prompt the user of the mobile device 101 to provide credentials for out-of-band authentication of the access attempt. Notably, the secured asset need not be an online resource or necessarily correspond to an access attempt from a client computing device different from the mobile device 101. For example, the secured asset may be a secured program or file on either another client computing device or the mobile computing device. In implementations where the secured asset is a resource that may be accessed offline, there may exist a reasonable expectation that devices that typically access the asset include or can obtain network 121 access such that an authenticating entity may be notified of a user's attempt to access the asset, like a secured program of file stored on the device. In some cases, the secured asset may not require authentication upon every access attempt, but rather require authentication when a network connection 121 exists or require authentication after a period of time, like 1-30 days. In the case of a device accessing secured assets that correspond to online resources, e.g., over a network 121, such access is inherent.

The authentication application 120 may be an application, like a native application 125, configured to execute within the CEE 113. The authentication application 120, like other native application applications 125, may be downloaded to the mobile device 101 and subsequently installed, such as by a user of the mobile device 101. Alternatively, the authentication application and one or more other applications, like some other native applications 125, may be preloaded on the mobile device 101 or included in an operating system of the mobile device.

Once installed on the mobile device 101, the authentication application 120 may be loaded into memory 117 and executed by the processor 115 within the client execution environment 113 to perform one or more of the operations described herein. In some embodiments, the authentication application 120, when executed by the processor 115, includes a registration process that is executed to register the authentication application 120 with a server (e.g., server 145 and/or server 155). During the registration process, the authentication application 120 may communicate or otherwise establish identifying information about the user and the mobile device 101 with the server. Example communicated information and data may include one or more keys 108, a digital signature of data based on a key 108, cryptographic hashes of credentials 109 or other user or device 101 specific information and data stored within the TEE 103. Example communicated information may also include information about notification services available to the authentication application 120 for receiving notifications pertaining to requests for authentication of a user through the authentication application. Example communicated information may further include one or more preferences or setting pertaining to credentials the mobile device 101 is operable to or configured to obtain (e.g., directly or from a wearable or other device) and/or credentials the user is willing to utilize (e.g., password, faceprint, fingerprint, etc.). Example communicated information may further include policy information governing use of different credentials and properties thereof. Policy information may be stored on the mobile device 101 and/or the server. Policy information may be updated for different secured assets.

In some embodiments the authentication application 120 includes one or more modules, such as an event handler, which may be loaded into memory 117 and executed by the processor 115 as a background service. In some embodiments one or more of those modules, such as the event handler, or other functions ascribed to the authentication application 120, may be included in or as separate companion applications that are executed (e.g., as background services) to provide similar functionality.

The authentication application 120, as described above, may be configured to detect or otherwise receive notifications pertaining to a user's attempt to access a secured asset, such as an online resource. In many cases, the access attempt is initiated from a device different from the mobile device 101, such as via a client device 135.

In response to such a notification, the authentication application 120 may be configured to interface with the TEE 103, such as via the API 104. The authentication application 120 may also be configured to interface with one or more native applications 125. For example, the authentication application 120 may query the API 104 or a native application 125 to solicit or otherwise collect a credential input from a user. In turn, the authentication application 120 interfaces with the TEE 103 to obtain a result for the credential input by the user. The credential input, whether biometric, pin, alphanumeric password or other, is processed within the TEE 103 to determine a result. The TEE 103 may process the credential input responsive to one or more requests or commands received from the authentication application 120 via the API 104. to the TEE of the mobile device. In some cases, the result may include an indication of whether the input credential matches a stored valid representation of the credential 109 or does not match the stored credential. If the input credential matches the valid representation within the TEE 103, the result may be cryptographically signed within the TEE 103 and transmitted to the server. In turn, the server may verify the result responsive to the signature indicating the user authenticated with the device 101. In some cases, the result may include a cryptographically signed input credential or hash (which may be a cryptographic hash) thereof for remote matching and verification by the server. For example, the TEE 103 may sign a cryptographic hash of the input credential within the TEE 103. The TEE 103 may output data, such as a representation of the input credential and identifying data for the notification for which the credential was collected, and signed data, where the signed data may be a signature of a data string comprising the input credential and the identifying information for the notification. The server may receive the result and may compare a cryptographically hashed input credential from the output data to a valid representation of the credential, where the valid representation of the credential was hashed with a same cryptographic hash function, in addition to verifying a signature, such as with a public key received in a prior registration process. Thus, the authentication application 120 may transmit a given result received from the TEE 103 to a server in accordance with the different implementations described herein. In cases where the input credential does not match the stored credential, solicitation or collection of credential input may be performed again, as described above. In the case of remote verification failure, a subsequent notification may be received and processed by the authentication application 120.

The authentication application 120 may be configured to establish a session defining a secure channel with the TEE 103 to protect data communications between the authentication application and the TEE. For example, the authentication application 120 may be configured to generate an identifier and provide the identifier to the TEE 103, such as via the API 104. The identifier may be tied to the authentication application 120, determined at random, selected deterministically (e.g., based on a register value, system time, etc.), or a combination thereof, such as concatenation of an identifier tied to the authentication application 120 and a current system time. Further, the identifier may be determined by a processing of the data described above, such as by input of the data into a cryptographic hashing function or key generation algorithm to generate the identifier. In turn, the TEE 103 may return a session bound to the identifier such that other applications cannot access data transmitted between the authentication application 120 and the TEE 103, which can include data created during the session. The data created and transmitted during the session may include one or more keys, results, and/or other requests and responses generated during the session. For example, during a session, the user may establish one or more credentials 109 in TEE memory 107 for use with the authentication application 120. The established credentials 109 may include cryptographic hashes or other ciphertext of credential values whether biometric or alphanumeric, such that those representations may be passed to a sever, like authentication server 155, for authentication operations without divulging actual credential values. In addition, or alternatively, the established credentials 109 may include unique signature information from the TEE 103 (such as a public key) that is passed to the authentication server 155 such that signed data (with a corresponding private key) output by the TEE can be verified as originating from the TEE.

The authentication application 120 may receive credentials 116 (e.g., public keys and representations of credentials) like those described above from the TEE 103 for out-of-band authentication operations. Those credentials 116 received by the authentication application 120 may be stored in memory 117 within the CEE 113 and transmitted to a server without divulging actual credential values, as they are representative of credential values protected within the TEE. The authentication application 120 may verify they originated from the TEE (e.g., verification of signed data output by the TEE), and pass the credentials to a server, like the authentication server 155. One or more of the credentials may be passed in a registration process with a server, like authentication server 155, or in response to a received notification. For example, in a registration process, the authentication application 120 may be configured to pass signature information to the server such that received data can be verified as originating from the TEE 103 and one or more representations of credentials for different credential input options may also be passed. During an authentication process, such as in response to receipt of a notification requesting the user to authenticate via one or more different credential input options, the authentication application 120 may pass data and signed data received from the TEE 103 to the server for verification. In some embodiments, the authentication application 120 may request the TEE 103 output signed data with a timestamp and/or include identifying information associated with a particular notification such that signed data may be considered valid for a particular notification and/or at a particular point in time to prohibit reuse. In other words, the server may check that 1) a timestamp or other identifying information associated with a notification matches a transmitted notification, 2) a representation of a credential in output data matches a stored representation (e.g., one stored by the server during a registration process), and 3) signed data, which may be a signature of an output data string of (1) and (2), e.g., {representation, notification ID and/or timestamp}, is verifiable by a public key provided by the TEE during a registration process. The verification process indicating that (1) and (2) were provided by the TEE 103 as only the TEE stores the private key operable to generate signed data verifiable by the data, organized into the string, and the corresponding public key. In some embodiments, the identifying information for a particular notification may include a particular location or address (e.g., IP address and port number, identifier on a notification service, etc.) to which the authentication application 120 should transmit output data and signed data. In some embodiments, the location and/or address may be specific to the notification and the authentication application 120 may request signed output data including the location and/or address specified by the notification to further inhibit possible reuse.

In some embodiments, a session received by the authentication application 120 from the TEE 103 may be in a state that requires registration, such as upon initially executing the authentication application as described above, or a state to continue communications. In the state to continue communications, establishment of the secure channel may be predicated upon the user (and optionally the authentication application itself) successfully authenticating based upon past credentials and/or deterministic values.

In the registration state, the authentication application 120 may be configured to execute a key exchange process with the TEE 103 to initialize a session. For example, the authentication application 120 may provide an identifier to the TEE 103, and the TEE may return a shared key by which the authentication application 120 and TEE 103 can securely exchange data over a channel for the duration of the session. In some embodiments, the shared key generated by the TEE 103 is based on the identifier. The authentication application 120 may be configured to verify that the shared key was generated within the TEE 103, such as by verifying a signature of the TEE. In another example, the authentication application 120 may request a public key of a key pair from the TEE 103. The authentication application 120 may be configured to verify that the public key was generated within the TEE 103, such as by verifying a signature provided by the TEE. In turn, the authentication application 120 may encrypt information with the public key for transmission to the TEE 103. For example, the authentication application 120 may provide the identifier encrypted with the public key in a transmission to the TEE 103, and the identifier may serve as a shared key for encrypted data transmitted during the session. In some embodiments, the identifier may be a public key of a key pair, and the TEE 103 may return a shared key to the authentication application 120, encrypted with the identifier (public key), and the authentication application may decrypt the shared key with the corresponding private key of the key pair to determine the shared key value. The authentication application 120 may determine that any keys or other data received from the TEE 103 were generated within the TEE by the verification of a signature of the data received from the TEE 103. With a shared key established, the authentication application 120 may transmit data to the TEE 103 either by encryption with a public key provided by the TEE 103 or by a shared key.

In some embodiments, the authentication application 120 is configured to interface with the TEE 103 to establish one or more valid credentials 109 for the user within the TEE. The process may occur subsequent to the establishment of a secure channel with the TEE. Some of those credentials 109 may already exist within the TEE 103, such as those previously established by the user, and which the TEE may store for authentication of the user when utilizing the authentication application 120. Those credentials stored for utilization with the authentication application 120 may be encrypted and/or cryptographically hashed to produce representative values. The representations may even differ for different relying parties utilizing the authentication system. For example, the authentication application 120 may be configured to register for different ones of the relying parties by a process similar to the registration process described above, such as by using different identifiers, and notifications may indicate to which relying party they pertain such that corresponding representations may be requested from the TEE 103 as output. A user may authenticate via input of one or more of the credentials to configure those credentials for use with the authentication application 120. As described previously, the TEE 103 may encrypt representations of those credentials 109 for use in association with the authentication application 120. In some embodiments, different ones of the credentials selected for use in association with the authentication application 120 may be checked against a policy. Credentials not conforming to the policy, whether by strength, length, or security, may be rejected and the use optionally permitted to resubmit credentials for storage within the TEE as applicable. In addition, with a secure channel established with the TEE 103, a user may update one or more credentials. In some embodiments, any updating or establishing of credentials is subject to authentication of the user, such by the user providing one or more input credentials that match valid representations of credentials 109 stored within the TEE 103. For example, in order for the authentication application 120 to instruct the TEE co-processor 105 to execute one or more tasks within the TEE, such as read/write operations within the TEE memory 107, via the API 104, authentication of the user may be required.

In some embodiments, the authentication application 120 is configured to increment a counter associated with communications received from the TEE 103. Specifically, the TEE 103 may provide a counter value that the authentication application 120 must increment and include in a response to or a next communication with the TEE 103 for the TEE to consider the response valid. The TEE 103 may consider the response valid when the incremented count value returned by the authentication application 120 matches an expected value. In addition, for each valid response, the TEE 103 may compare the counter value to a threshold. If the counter value (or a tracked number of increments) exceeds a threshold, the TEE 103 may request the authentication application 120 repeat the previously described key-exchange process to refresh the secure channel and reset the count. In some embodiments, the TEE 103 may refresh the secure channel dependent on whether the user can provide a requested credential that matches a valid representation of credential 109 stored within the TEE, as described above.

The counter value (or values) may be a numerical value or alphanumerical value, like a hash of a numerical value, or some other value. Examples of other values may be a value output by a linear shift register, an identifier of a linear shift register to increment, a location in memory, or other value that may be incremented by the authentication application 120 for a comparison to an expected value, and by which the TEE 103 can track a number of increments performed (e.g., a count). In some embodiments, the incrementing is performed deterministically, for example, the authentication application 120 may increment a counter value provided by the TEE 103 based on a value output from incrementing a given linear shift register or from a provided location in memory. TEE 103 may determine a count from a number of increments (e.g., inputs) provided to a liner shift register or to another functional component (or function) and verify the output value provided by the authentication application 120. Regardless of the specific implementation, verification of the incremented value with an expected value within the TEE 103 ensures that the communication from the authentication application 120 is legitimate and without any attempted injection by an outside actor.

An example client device 135 is illustrated in FIG. 1 and may include access to the network 121. In many instances the network 121 includes the public and/or private networks and may include the Internet, telephonic data communications, etc., and the example client device 135 is a computing device like a laptop, desktop, or workstation operated with network access in a home, office, and/or field environment. In some embodiments, an example client device 135 may be a terminal device or otherwise configured to provide a user interface for terminal access to one or more computing devices and/or virtual machines that may include or provide access to a secure asset and/or be a secure asset themselves. In some cases, the client device 135 may operate on an internal network (not shown) and may or may not have public network access (e.g., network 121) but include a connection on the internal network to one or more of servers 145, 155 or other server that may have and/or afford public network access. Some configurations may allow tunneling into an internal network from another network (e.g., a public network) via secure connection such as VPN or other encrypted communication protocol.

In some cases, an example internal network may be wholly internal, such as a private network within a corporation, and supports communications between the client device 135 and server 145 and/or server 155. Example implementations of the client device 135 in such instances may be a terminal or workstation within a secure environment (e.g., a server room). In such cases, the mobile device 101 may only gain access to that example network while on site (e.g., within range of a wireless connection or while coupled to a wired connection of the internal network) and notifications may be forced to flow through the internal network to afford enhanced security.

Different example client devices 135 may be configured to access different secured assets in a variety of different ways. For example, a client device 135 may attempt to access a secured asset such as an online resource 147 on or via one or more servers 145. In some embodiments, the client device 135 may attempt to access the online resource 147 on or via one or more servers 145 using an application 110 installed to the client device 135. In another example, a client device 135 may attempt to access a secured asset such as an application 110 executed on the client device. In some embodiments, the application 110 may also be configured to access an online resource 147 on or via one or more servers 145.

In association with a given access attempt of a secure asset, a user of the client device 135 may supply credentials 111 for accessing the secured asset. Those credentials 111 may be supplied in different ways, several examples of which are outlined below. In one example, the secure asset is an online resource 147 on or accessible via one or more servers 145. The online resource 147 may be a server hosted application, application programming interface, user account, virtual machine, or other data or interface accessible by the client device 135 via the server 145. In some embodiments, the client device 135 may include an application 110 configured to access the online resource 147. For example, the application 110 may be a web browser configured to request data on and receive data from the server 145 for presentation on a display of the client device 135. Accordingly, the application 110 may be configured to retrieve data from the server 145 and present the data received from the server to the user. In some cases, the server 145 may redirect the application 110 to retrieve some or all data from one or more other servers, like server 155. The retrieved data, when executed or processed, may cause the application 110 to present on the display of the client device 135 a log-in page or other user interface including one or more fields or other user interface elements configured to receive user credential 111 input for accessing the online resource 147. In turn, the application 110 may transmit data corresponding to the credentials 111 input by the user, which may be a user name, password, and/or selection of one of more user interface elements, to a given server (e.g., at least one of server 145 and/or server 155) specified in the retrieved data for authentication. In some embodiments, the application 110 may transmit data corresponding to the credentials 111 without direct user input of the credentials, such as where the user has configured the application 110 to populate fields with and/or automatically submit stored credentials. In some embodiments, when executed or processed, the retrieved data may cause the application 110 to automatically collect and/or transmit other identifying data corresponding to the user and/or client device 135 with the credentials 111. For example, the application 110 may collect and/or generate identifying data about the user-client device 135 combination in the form of cookie, log, token, or other data. In addition, or alternatively, the application 110 may collect identifying data about the user-client device combination, such as by querying the runtime environment on the client device. All or a subset of the above information may be transmitted to one or more of servers 145 and/or 155.

In another example, the secure asset may be an application 110 executed by the client device 135 and configured to prompt the user to supply credentials 111 when the user attempts to utilize the application or a feature thereof. Similarly, in another example, the secure asset may be an online resource 147 accessible by the application 110 and the application may be configured to prompt the user to supply credentials 111 in response to the user attempting to utilize the application 110 to access the protected asset via the server 145. The application 110 may transmit received credentials to the server 145 and/or server 155 for authentication. In some embodiments, the application 110 and online resource 147 may both be secure assets, and the user may be prompted to provide same or different credentials when attempting to access different secure assets. In some embodiments, the application 110 may be configured to automatically collect and/or store previously supplied credentials and automatically transmit the collected or previously supplied credentials to the server 145 and/or server 155 without prompting the user. The application 110 may similarly collect identifying data about the user-client device combination as described previously for transmission to a server.

In some embodiments, a secure session is established between the client device 135 and one or more of server 145 and/or 155 for the transmitting of credentials and/or the exchange of user-client device data. The secure session may be HTTP over TLS/SSL, SSH or other secure connection type by which the client device 135 (or applications thereon) can exchange data with a server (or application applications thereon). The secure session may be held open by the server for a pre-configured amount of time (e.g., 1-180 seconds) before timing out to allow enough time for a user to authenticate with the authentication server 155. Once authenticated, the client device 135 may be permitted to access the secure asset. In some embodiments, based on the credentials 111 and/or user-client device information, a server may generate a token tied to that information and transmit that token to the client device 135. In turn, the client device 135 may present the token within a set period of time (e.g., 10-9999 ms or 1-180 seconds) after authentication to access the secure asset.

Tokening of the client may occur in addition to or separate from the secure session. For example, when attempting to access a secure asset on server 145, the client may 135 may be redirected (e.g., via HTTP request) to establish a secure session with server 155 and provide credentials 111 and/or user-client device information to the server 155. When the server 155 authenticates the client device 135, it may pass a token in a redirect (e.g., via HTTP request) that directs the client device 135 back to the server 145 to access the asset.

Some embodiments may include a relying party server 145, which may host or otherwise include a secure asset, like an online resource 147, accessible by devices over a network, such as by the client device 135 over the network 121. Examples of online resources 147 may include a user account, web applications, and other data as described herein. The relying party server 145 is configured to provide access to such resources 147 for authenticated users of client devices 135.

In some embodiments of the relying party 145 may include a user identification repository 160, which may store information about users and clients. For example, the UID repository 160 may store identifying information including one or more of user identifiers, device identifiers, identifying tokens for user and/or devices, locations of devices on a network, and the like. The UID repository 160 may also store associations between one or more identifiers, for example, a user identifier may be associated with one or more device identifiers to which that user is permitted access or otherwise uses to access the server. In some embodiments, the UID repository 160 may further store credentials associated with the identifying information for users and clients, though it need not be required to.

In response to an attempt by a client device 135 to access the relying party server 145 and thus the example online resource 147, the relying party sever 145 may respond in variety of ways. For example, the server 145 may request credential information from the client device 135, such as by directing an application 110 on the client device 135 to a log-in page or other interface for the submission of credentials, requesting the application direct the user to input credentials, requesting the application provide credential information already input by the user, and/or requesting the application provide identifying information about the client device and/or user (e.g., cookies, logs, tokens, etc. or values thereof). In some embodiments, the replaying party server 145 may collect information about the user and/or client device 135, such as a network address, location associated with the network address, information about the application 110 and/or client device such as version, runtime environment, etc. and/or other information. Credential information may include a user identifier, such as an email, employee ID, active user account, user name, etc., hash thereof or other identifying information about the user and optionally a password. Information about the client device 135 and/or application 110 may include a device identifier, which may be a combination or hash of information determined about the client device and/or application. An example device identifier may account for information such as a MAC address, EMEI number, identifiers of one or more other hardware components of the device, etc., and/or may include information indicative of the runtime environment like operating system version and type, application version, screen size or resolution, or other factor or combination of factors relatively unique to a given device. Accordingly, the device identifier may serve to accurately identify a given client device from other client devices at least for a relatively long period of time (e.g., hours, days, months, or even the lifetime of the device).

In some embodiments, the relying party server 145 may compare information about and/or received from the client device 135 with information stored in the UID repository 160 to determine which user and/or device is attempting to access a given secure asset, such as the online resource 147. For example, the relying party server 145 may identify a user identifier and/or a device identifier stored within the UID repository 160 corresponding to the access attempt. In response to determining which user and/or device is attempting to access the secure asset, such as by determining one or more identifiers stored within the UID repository 160 corresponding to the access attempt, the relying party server 145 may transmit information about access attempt to the authentication server 155. The forwarded information may include the one or more identifiers determined from the UID repository 160 to correspond to the access attempt, in addition to information received from, or determined about, the client device 135. In turn, the relying party server 145 may receive an authentication result from the authentication server 155. The authentication result indicates whether the user of the client device 135 successfully authenticated with the authentication server 155 (e.g., via the mobile device 101). Based on the authentication result received from the authentication server 155, the relying party server 145 grants (in response to successful authentication) or denies (in response to unsuccessful authentication) the access attempt by the client device 135. If a result is not received within a threshold period of time, the server 145 may deny the access attempt (e.g., by timing out a connection).

In some embodiments, the relying party server 145 performs one or more preliminary verification tasks prior to passing information about the access attempt to the authentication server 155. For example, the server 145 may determine whether the user and/or client device is permitted to access the given secure asset. In such cases, the UID repository 160 may store associations between user and/or device identifiers and different assets to which a user and/or device is permitted access. In some embodiments, the relying party server 1345 may also determine whether a password or other credential received from the client device 135 matches a corresponding credential stored in association with a user identifier and/or device identifier within the UID repository 160.

As described above, in response to an attempt by a client device 135 to access the relying party server 145 and thus the example online resource 147, the relying party sever 145 may respond in variety of ways. For example, in some embodiments, the server 145 may pass information received from the client device 135 to the authorization server 155 without performing some or all of the previously described operations within the UID repository 160. In turn, the server 145 may wait for an authentication result from the authentication server 155 and grant or deny the client device access based on the received result or time out the access attempt if not result is received within a threshold amount of time.

In some embodiments, the server 145 may redirect the client device 135 to the authentication server 155. In turn, the server 145 may wait for an authentication result from the authentication server 155 and grant or deny the client device access based on the received result or time out the access attempt if not result is received within a threshold amount of time. In some embodiments, the authentication result may be a token for one or more associated identifiers, and the server 145 may store the token within the UID repository 160 in association with one or more identifiers. One example might be a token and a device identifier for a given device and optionally a user account to which that device identifier corresponds. The token may include an associated timestamp or time-stamps that indicate when the token was created and/or when it expires. In either instance, the server 145 may determine from a time stamp whether a token associated with a given identifier is inactive or active. In accordance with the above example, the server 145 may receive, from the client device 135 during an access attempt, a token in addition to information previously described. The server 145 may determine, from information stored within the UID repository 160 in response to receiving a token from the client device 135, whether the received token matches a valid token received from the authentication server 155. The server 145 may also determine, from an association between the valid token and an identifier within the UID repository 160, whether information received from and/or determined about the client device corresponds to the identifier stored within the UID repository 160. For example, the authentication server 155 may be configured to cryptographically hash a specific set (and optionally order) of determinable information received from and/or about the client device 135 to create an identifier. Similarly, the relying party server 145 may be configured to execute a process in a similar manner to determine an identifier for a client device attempting to access a secured asset. As the identifier can uniquely identify the client device 135 from other client devices, the relying party server 145 can determine to grant the client device 135 access if the token presented by the client device matches a valid token in the repository 160 and an identifier determined for the client device matches the identifier associated with the valid token in the repository 160.

The set of determinable data and order of the determinable data utilized to create an identifier may be held secret by the relying party 155 and the authentication server 155 and optionally may change over time and/or be based on a function dependent on one or more determinable factors. Accordingly, the authorization server 155 may push information about valid tokens and associated identifiers to the relying party server 145 for authenticated clients such that the relying party server 145 may quickly determine whether a client device is permitted to access a given secure asset. For example, a function in a process for creating an identifier may utilize one or more token values as input to determine the set and order of data of determinable data to cryptographically hash for an identifier.

Thus, as described above, the relying party 145 relies on the authentication server 155 to perform one or more operations in the authentication process, and permits or denies a client device 135 access to a secure asset, such as online resource 147, in response to authentication results received from the authentication server 155. Operations of the authentication server 155 are described in more detail below.

The authentication server 155 performs operations to authenticate users and provides authentication results that indicate whether a user was authenticated. The authentication results may be utilized by other parties, such as a relying party 145, to determine whether a given client device 135 should be granted or denied access to a secure asset. User authentication operations performed by the authentication server 155 may be performed out-of-band from attempts by client devices 135 to access secure assets. Namely, user authentication operations may involve a device different from the client device 135, such as a mobile device 101.

The mobile device 101, as described previously, is typically a device under control of the user the authentication server 155 seeks to authenticate and is operable to store credentials specific to that user in a secure fashion. For example, the mobile device 101 may include a TEE 103 to store credentials 109 in a secure fashion. Further, the TEE 103 may be operable to generate representations of credential values such that those representations can be passed by the TEE to the CEE 113, and by the CEE 113 to the authentication server 155 without divulging actual credential values. In some embodiments, the representations of credential values may be refreshed or updated within the TEE 103 without requiring a change in credential values. For example, representations of credential values may be dependent on one or more key values or function values used as input in a cryptographic hashing function or encryption algorithm to generate the representations. In turn, the key values and/or function values may be updated within the TEE 103 to generated refreshed representations, rather than requiring a user to provide a new credential values, which is particularly beneficial in instances where a user may be unable to change a credential value (e.g., for a specific biometric input). As a result, the authentication server 155 receives and stores only the representations of credential values and any data breach cannot disclose user specific credential values. Moreover, in response to any data breach, divulged representations of credential values may simply be discarded and replaced with refreshed or updated representations of credential values. Thus, attackers are limited to targeting individual users. However, in order to ascertain credential values for an individual user, an attacker would need to breach the TEE 103 of the mobile device 101 storing those values. Such a process is time consuming, rarely successful, and would require physical access to a device of the individual storing credential values. Furthermore, because representations are used for user authentication, even if an attacker was successful in obtaining credential values from the TEE of a device, they would only be operable if the attacker knew the current schema for generating a representation thereof after a user reports the device missing or stolen. The end result in view of these mounting difficulties for would be attackers is a highly secure authentication system that mitigates the effectiveness of both specific user targeted and wide scale attacks.

The authentication server 155 may store data for authentication operations in an authorization repository 165. The authorization repository 165 may include a vast number of UID Records 151. A UID Record 151 may include information associated with a particular user and the devices associated with that user. In some embodiments, a UID Record 151 for a particular user may be created for a particular relying party or utilized across multiple relying parties. For example, a given user may have a different UID Record 151 associated with the different relying parties utilizing the authentication system and which the user engages. One relying party may be an employer of the user, another relying party may be a financial institution utilized by the user, and yet another relying party may be an application developer from which the user has purchased an application for personal use. The different UID Records for a same user may have some same information, such as if the user utilizes the same mobile device 101 for authentication with each party, device information for the mobile device 101 may remain the same across the different UID Records. However, the different UID Records for different relying parties may be segmented within the repository 165 for a variety of different reasons, such as compliance with relying party requirements, government regulations, or user privacy in general.

Information associated with a particular user in a UID Record 151 may include one or more user identifiers that user utilizes with a relying party, such as a username, email address, employee ID, etc. The user identifiers may also be representations of user identifies, such as cryptographic hashes of user identifiers, and the cryptographic hashing function may be specific to a given relying party. UID Records 151 may be created by the authentication server 155 when a given user elects to utilize an authentication application for user authentication to access assets of the relying party. Alternatively, UID Records 151 may be created by the authentication server 155 upon request by a relying party. The request may include user provided account information for generation of a UID Record. In some embodiments, the authentication server 155 may handle user registration for the relying party and receive and process some or all of the user provided information directly to generate a UID Record 151 for the user. A relying party administrator may also provide or otherwise create specified account information for generation of a UID Record, such as when an administrator of the relying party creates an employee account.

The UID Record 151 may include a plurality of constituent device records for devices associated with that user that may be utilized for authentication or accessing a secure asset. For example, a user having UID record 151 may utilize a device A for user authentication and a device B for accessing secure assets of a relying party.

By way of example, Device A record may be mobile device 101 registered with the authorization server 155 for user authentication to access secure assets of the relying party. During a registration process, such as one performed through an authentication application 120, initial information about the mobile device 101 may be collected and stored within the device A record. The initial information may include information operable to identify the device and transmit notifications to the device. In some cases, that identifier may be utilized by the authentication server 155 to transmit notifications. Some of the information about the mobile device 101 may also be updated over time based on information about the device provided to the authentication server 155 by the authentication application 120 on the mobile device. The Device A record for the mobile device 101 may also contrail the out-of-band credentials A for authentication of a user of the mobile device. For example, the OoB Credentials A may include representations of various different credentials provided in a registration process of Device A and a public key for verifying signed data received from Device A.

Device B record may correspond to a client device 135 utilized by the user. Depending on the relying party, there may be multiple device records corresponding to different client devices utilized by the user over time. Client devices need not be registered, and records for client devices may be created over time as a user utilizes different client devices to access secure assets. However, in some cases, the client device 135 may optionally be registered with the authorization server 155 for use by a particular user or to access secure assets of the relying party. A Device B record for a client device like client device 135 may contain an identifier and/or other identifying information for the device and optionally credentials B, where those credentials may be in-band credentials (e.g., account/password/token, etc.) for applicable embodiments. Some of those in-band credentials may alternatively be stored under the UID Record 151 for client devices 135 in general rather than for a specific client device. However, some credentials may be preferable to store in a device specific fashion, such as which device is currently using a given license (e.g., a product key) for some secure asset.

In some embodiments, permissions may be specified for a UID Record 151 and/or for a given device. Permissions for a UID Record 151, generally, may define which assets the user (associated with the UID Record) may access and how the user may access those assets. Permission for a client device (e.g., one registered by an administrator associated with the relying party), generally, may define which users may access the device and optionally what assets that device is permitted to access, which may differ from assets the user (associated with the UID Record 151 of the user utilizing the device) is permitted to access.

For example, in a business environment context, the client device 135 may be assigned to a particular employee by an administrator of the relying party and Device B record may be stored under the UID Record of the employee. In some embodiments, an administrator may register the client device with specific permissions to restrict use to a specified subset of users or such that only registered devices may access secure assets.

In another example context, the relying party (e.g., globally or per secure asset) may specify permissions governing amounts and/or types of devices allowed under a UID Record 151. As described above, the UID Record 151 may contain a user identifier tied to a particular user/account. When a given client device (e.g., client device 135) attempts to access a secure asset in association with that user identifier, the authentication server 155 may create a device record (e.g., Device B) corresponding to the given client device under the UID Record 151 for that user identifier. Permissions may specify a number of client devices which may be active under a given UID Record 151, such as to restrict use of a secure asset to a given number of devices overall, or to restrict use of a secure asset to a given number of devices at a particular time. For example, if the protected asset is a web application, permissions may be a license agreement that prohibits the use of multiple client devices (or over a threshold number of client devices) at the same time under a same UID Record 151. Similarly, if the protected asset is an application installed to a client device, permissions may be a license agreement restricting use and installation of the application to a single client. Tracking client devices in this manner may also be used for security purposes, such as to detect when an unknown or new client device attempts to access an asset or if multiple unknown or new client devices attempt to access an asset, and whether or not those access attempts are successful. For example, which devices are authenticated by which credential provided by the mobile device 101 may be tracked and additional and/or multiple credentials may be requested for new and/or additional client devices attempting to access a same asset.

Some or all of the information stored within the UID repository 160 or representations thereof may be stored within the authorization repository 165 in UID Records 151. In some embodiments, the auth repository 165 is also configured to store data to perform one or more of the functions ascribed the UID repository 160. For example, rather than the relying party server 145 utilize the UID repository 160, it may instead utilize the auth repository 165. In such a configuration, the auth repository 165 may be configured to respond to queries to return, store, or otherwise provide data in a similar fashion as the UID repository 160. The data structure of the auth repository 165 may differ from that of the UID repository 160, but one or more queries received at the auth repository 165 from the relying party server 145 may be operable to return and store similar data from the data structure of the auth repository 165. Benefits of such configurations may reduce overhead for relying parties 145 as they can significantly offload authentication burden and reduce storage of user specific data in addition to increasing security. For example, in the previously described example utilizing tokens, the process may continue in much of the same fashion, but rather than the relying party server 145 determining whether the token-identifier combination corresponds to an authenticated client, the relying party server 145 need only query the auth repository 165 or the authentication server 155 with the token, identifier, and/or information on used for the identifier. In an example embodiment, the relying party server 145 may query the auth repository 165 with a token and an identifier determined for the client device that presented the token and the auth repository may provide an authentication result. In some example embodiments, the queries may flow through the authentication server 155 such that, for example, the authentication server 155 may process the information to determine the identifier (e.g., such that only the authentication server 155 houses the logic for the determination) and return a result.

Figure 2:
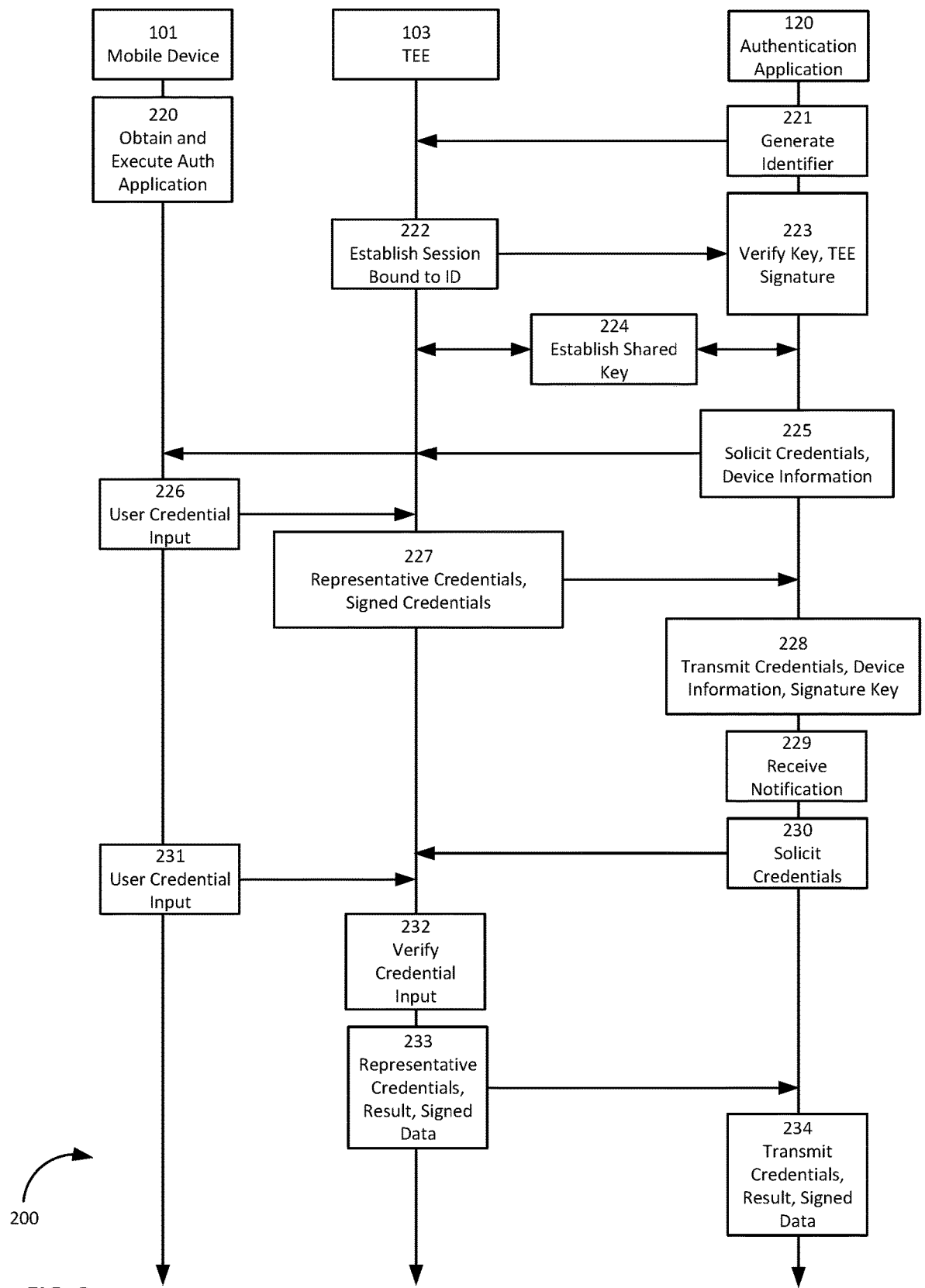
FIG. 2 is a diagram showing an example of a process for authentication of a user within the example computing environment.

FIG. 2 is a diagram showing an example of a process 200 for authentication of a user. The process 200 may be executed within an example computing environment, such as the example computing environment 100 illustrated in FIG. 1.

The process 200 of FIG. 2 illustrates operations performed by a device, such as a mobile device 101 including a trusted execution environment 103 and authentication application 120, according to at least one embodiment described herein. As described previously, example mobile devices 101 may include a trusted execution environment 103 and execute an authentication application 120. As such, the separation of the blocks 101, 103, 120 may be considered illustrative as each of the operations may be performed on a mobile device 101.

The process 200 may begin with the obtaining 220 of an authentication application on the mobile device 101. Examples of obtaining the authentication application on the mobile device may include a preloading of the authentication application on the mobile device 101 or downloading of the authentication application to the mobile device from an application repository. Further, step 220 may include executing the authentication application on the mobile device 101, which may include loading the authentication application in a memory of the mobile device and executing the authentication application by a processor of the mobile device. The memory and processor of the mobile device 101 may be configured for the execution of applications within a client execution environment (CEE), which may be isolated from a trusted execution environment 103 (TEE) of the mobile device. The TEE 103 may include a secure memory and co-processor not accessible by applications within the CEE.

The authentication application 120 may be configured to interface with the TEE 103 of the mobile device 101, such as via an application programming interface (API) configured to exchange data between the CEE and the TEE. The exchange of data via the API may occur by way of one or more requests and responses, each of which may contain data. In some embodiments, to increase security of communications between the TEE and the authentication application 120 within the CEE, the authentication application 120 is configured to establish a secure session, e.g., a secure channel of communications, with the TEE 103. The secure session may be considered secure by way of encryption of data communicated between the authentication application 120 and the TEE 103.

Once executed, such as within the CEE, the authentication application 120 perform one or more operations in a registration process, which may correspond to steps 221-228. Starting with operation 221, the authentication application 120 may generate an identifier and pass the identifier to the TEE 103. For example, the authentication application 120 may pass the identifier to the TEE 103 in association with one or more requests for establishing a secure session.

The TEE 103 may also perform operations to establish a secure session. The TEE 103 may also bind a secure session to an identifier received from the authentication application. For example, the TEE 103 may generate one or more keys, and one or more of those keys may be bound to a received identifier. The TEE 103 may generate a public key and a private key of a key pair, which may be bound to the received identifier. Additionally, the TEE 103 may generate a shared key, which may be bound to the received identifier. The binding may be logical, such as by an association in memory, or one or more of those keys may be generated based on the identifier. For example, in response to a request for a secure session, the TEE 103 may generate a private and public key, and pass the public key to the authentication application 120 by which the application 120 may encrypt a generated identifier 221 to pass to the TEE 103. In turn, a shared key may be bound to or based on the generated identifier. Alternatively, the TEE 103 may sign the identifier or other data with a private signature key and pass the signed identifier or other data with the public signature key to the TEE 103 for verification. In either instance, a public key may be provided in a response to the authentication application 120, by which the authentication application may verify 223 that data was generated by the TEE.

Thus, the TEE 103 may establish 222 a session bound to the identifier generated by the authentication application 120 and output data for establishing the session to the authentication application. In addition, the TEE 103 may sign data corresponding to output data in the response, and provide a key (e.g., a public key) of the TEE 103, in association with the response. The signed data and the signature may be provided in a same response as a key or by one or more different responses.

The authentication application 120 receives responses from the TEE 103. The responses may include data, signed data, and/or a key for verifying signed data. The key may be a public key for verifying 223 a signature of the TEE 103 using a corresponding private key, such that the data may be verified as being generated by the TEE 103 based on the signed data and signature key. For example, a verification function may take as input the data, signed data, and signature key, and return a result indicating that the data corresponds to the signed data. In some embodiments, the data may be organized in a string for signing and verification. Example string values may correspond to data values or hashes of data values.

Once the authentication application 120 verifies that the TEE 103 generated data, the authentication application 120 and TEE 103 may establish a shared key 224. For example, the authentication application 120 may encrypt data (e.g., identifier or other data) corresponding to a shared key using a public key provided by the TEE 103. In turn, using a private key, the TEE 103 may decrypt the data to obtain the shared key. Alternatively, the process may occur in the other direction with the authentication application 120 providing a public key to the TEE 103, by which the TEE 103 can encrypt and return a shared key. The shared key may be utilized by the TEE 103 and the authentication application 120 to exchange data using symmetric encryption. In either instance, the shared key may be bound to an identifier generated by the authentication application 120.

In some embodiments, establishment 222 of the secure session further comprises an initialization of a count within the TEE 103. The TEE 103 may also provide a current count in responses to the TEE 103. The TEE 103 may respond to only those requests received from the authentication application 120 which increment the count. As such, the authentication application 120 may be configured to, in generating a request to the TEE 103, increment a current count last received from the TEE 103 in an immediately prior response to the generated request. Thus, in receiving a request from the authentication application 120, the TEE 103 may verify whether the incremented count was incremented in an appropriate manner (various examples of which are described within reference to FIG. 1). The TEE 103 may also verify whether the number of increments or a value of the count exceeds a threshold representative of a number of requests allowed for a given session. Upon determining the threshold has been reached, the TEE 103 may request the authentication application 120 refresh the sessions, such as by performing one or more of steps 221-224, which may include authentication of the use according to one or more credentials stored within the trusted execution environment 103.

With the shared key established, the authentication application 120 may solicit 225 credentials and device information from the TEE 103 and/or mobile device 101. Device information may include a device identifier solicited from the TEE 103 and/or mobile device 101 that is operable to receive a notification for authentication of the user of the mobile device. User input credentials 226 via the mobile device 101 may be obtained with the TEE 103. The TEE 103 may generate 227 representations of those credentials for transmission outside of the TEE without divulging actual credential values. The TEE 103 may sign output data corresponding to the representations and output the representations and the signed data. The TEE 103 may also output a public key corresponding to the private key utilized to generate signed data if different than a prior key provided to the authentication application 120.

The authentication application 120 receives data output from the TEE 103, which may include representations of credentials, signed data corresponding to those representations, and signature key for verifying signed data output by the TEE 103. As described above, the authentication application 120 may verify data was generated by the TEE 103 based on the signed data, key, and data. The authentication application 120 transmits 228 data, including the data output from the TEE 103, and device information of the mobile device 101, to a server to complete a registration. The data transmitted to the server many further include user account information (e.g., for a given relying party) to which the registration pertains. The server stores the information for later use to authenticate a user to access secure assets of the relying party.

After registration of the mobile device 101 by the authentication application 120, the authentication application may receive a notification 229 corresponding to an access attempt to access a secure asset of a relying party. The notification 229 may request solicitation of one or more user credential inputs, such as one or more of the different credentials established during the registration process. In response to the notification, the authentication 120 interfaces with the TEE 103 to solicit 230 the credentials requested by the notification.

The user may be prompted or otherwise request to input 231 one or more credentials. The input credentials are obtained within the TEE 103, and the TEE 103 may verify 232 credential input. Representations of the input credentials may be generated, or stored representations of the input credentials the TEE 103 verified 232 according to the input credentials may be output by the TEE 103. In some embodiments, the TEE 103 also provides a result of the verification. In some embodiments, the TEE 103 generates signed data corresponding to one or more of the output data and outputs the signed data. The signed data may also include inputs such as one or more timestamps or other identifying information describing when and/or what the signed data was generated for. For example, the signed data may take as input a representation of a credential and other information, such as a timestamp or other identification information for the notification. The other inputs may be included in the output data or selected from information also known to a server based on the last notification transmitted to the mobile device (which may select same other data in a verification of signed data). The data and signed data are provided to the authentication application 120, which transmits the data and signed data to a server for authentication. A signature key previously provided to the server in a registration process can be used to verify the signed data in accordance with the data (and optionally other data, such as notification information).

Figure 3:
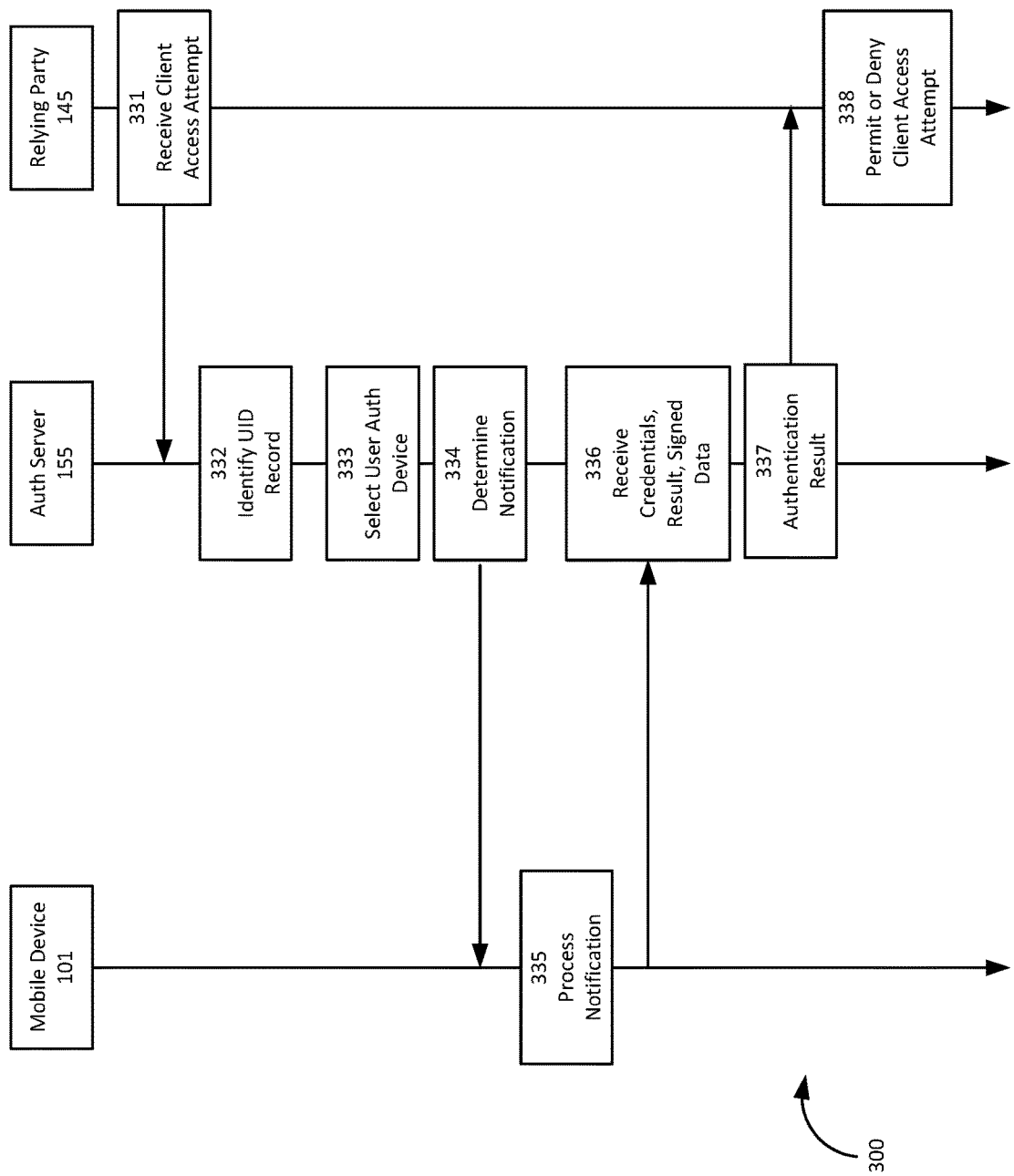
FIG. 3 is a diagram showing an example of a process for authentication of a device within the example computing environment.

FIG. 3 is a diagram showing an example of a process 300 for authentication of a device with another device in an out-of-band authentication process. The process 300 may occur within an example computing environment, such as the example computing environment 100 illustrated in FIG. 1. The process 300 of FIG. 3 illustrates example operations performed by various devices, such as a mobile device 101 including a trusted execution environment 103, an authorization server 115, and a relying party server 145 according to at least one embodiment described herein.

As shown, the process 300 begins with an access attempt by a client device at the relying party 145. The access attempt may be to a secure asset of the relying party 145, such as an online resource accessible by client devices over a network. The relying party 145 may pass information about the access attempt to the authentication server 155. The information passed to the authentication server 155 may include information such as user account information and/or device information associated with the access attempt. For example, the relying party 145 may receive a user account identifier at block 331 and pass the user account identifier to the authentication server 155.

The authentication server 155, based on the user account identifier, may identify a UID Record 332, such as within a repository storing various UID Records corresponding to different users and/or accounts. The UID record may be associated with or otherwise include the user account identifier for identification by the authentication server 155 based on information about an access attempt by a client device. The UID record identified by the authentication server 155 may include records or a listing of one or more devices registered with the authentication server 155 for user authentication. The authentication server 155 may select 333 a device according to a device record stored for the different ones of the registered devices. In some embodiments, the authentication server 155 selects a device different from the device attempting to access the asset when multiple devices are registered with the authentication server 155 under the UID Record. The selected device may also be determined by the authentication server 155 to have a trusted execution environment, such as by the registration of the device using an authentication application in accordance with various steps described with reference to FIG. 2. The registration of the device and creation of the device record may further include the receipt of credential information for the user from the device.

With a device selected based on the device record, the authentication server 155 may determine 334 a notification for transmission to the device. The notification may be determined responsive to information stored in the device record. For example, the device record may include a device identifier applicable to transmit the notification to the selected device. Similarly, the device record may store information about the different credentials which a user of the device may provide to authenticate with the authorization server using that device. The notification 334 determined by the authentication server 155 may identify one or more of the different credentials the user must provide.

The device, which may be a mobile device 101 having a trusted execution environment and previously registered with the authentication server 155, may receive the notification from the authentication server 155. In turn, such as by various steps described with reference to FIG. 2, the mobile device 101 may process 335 the notification within the trusted execution environment. The result of the processing 335 by the mobile device 101 may include various data transmitted to the authentication server 155 for authentication of the user of the mobile device.

For example, the authentication server 155 may receive a response to the notification from the mobile device that includes data corresponding to representations of requested credentials input by the user and/or results of any verifications performed within the TEE. The response may also include signed data for verification of the data. For example, the authentication server 155 may utilize a public key for signature verification previously received from the mobile device 101 in a registration process to verify the data was generated by the mobile device having the corresponding private key. In turn, the authentication server 155 may also verify whether the data (e.g., determined to have originated from the mobile device based on the signature) matches stored data. For example, the authentication server 155 may determine whether a received representation of the credential matches a previously stored representation of the credential. Further, the authentication server 155 may determine whether the received data corresponds to a notification 334 requesting that data. For example, the received data and/or verification process (e.g., using signed data) may include a timestamp or other identifying information for a notification (e.g., the notification from step 334) such that authentication server 155 can determine that the response was generated for a specific notification that requested it.

Based on the processing of the data and signed data received from the mobile device 110 for the notification transmitted to the mobile device at step 334, the authentication server 155 determines an authentication result. For example, if the data can verified as originating from the mobile device 101 the data was requested from based on the signed data and a stored key for the verifying, which may include verification of whether the data is responsive to the particular notification from step 334, and the received representation of a credential matches the stored representation of the credential that was requested, the authentication server 155 determines the user successfully authenticated. Alternatively, the authentication server 155 may determine that the user did not successfully authenticate, such as if one of the verification steps fails due to a lack of a match, credential different than that requested, or unable to verify data based on signed data, etc. The authentication server 155 transmits an authentication result to the relying party, for example the authentication result may indicate that the user was authenticated and the access attempt by the client should be granted or indicate that the user was not authenticated and the access attempt should be denied. In some embodiments, the result includes identifying information for the client device attempting to access the relying party based on the information previously received from the relying party 145 in association with the access attempt such that the attempt is granted or denied only for that particular device.

The relying party 145 receives the authentication result for the access attempt of step 331 from the authentication server 155. In turn, the relying party permits or denies 338 the access attempt by the client device based, at least in part, on the result. Accordingly, the access attempt by the client device from step 331 may be authenticated, at least in part, by involvement of a different device including a trusted execution environment, such as mobile device 101, that is operable to authenticate a user permitted to access the secure asset by additional factors for increased security of the asset.

Figure 4:
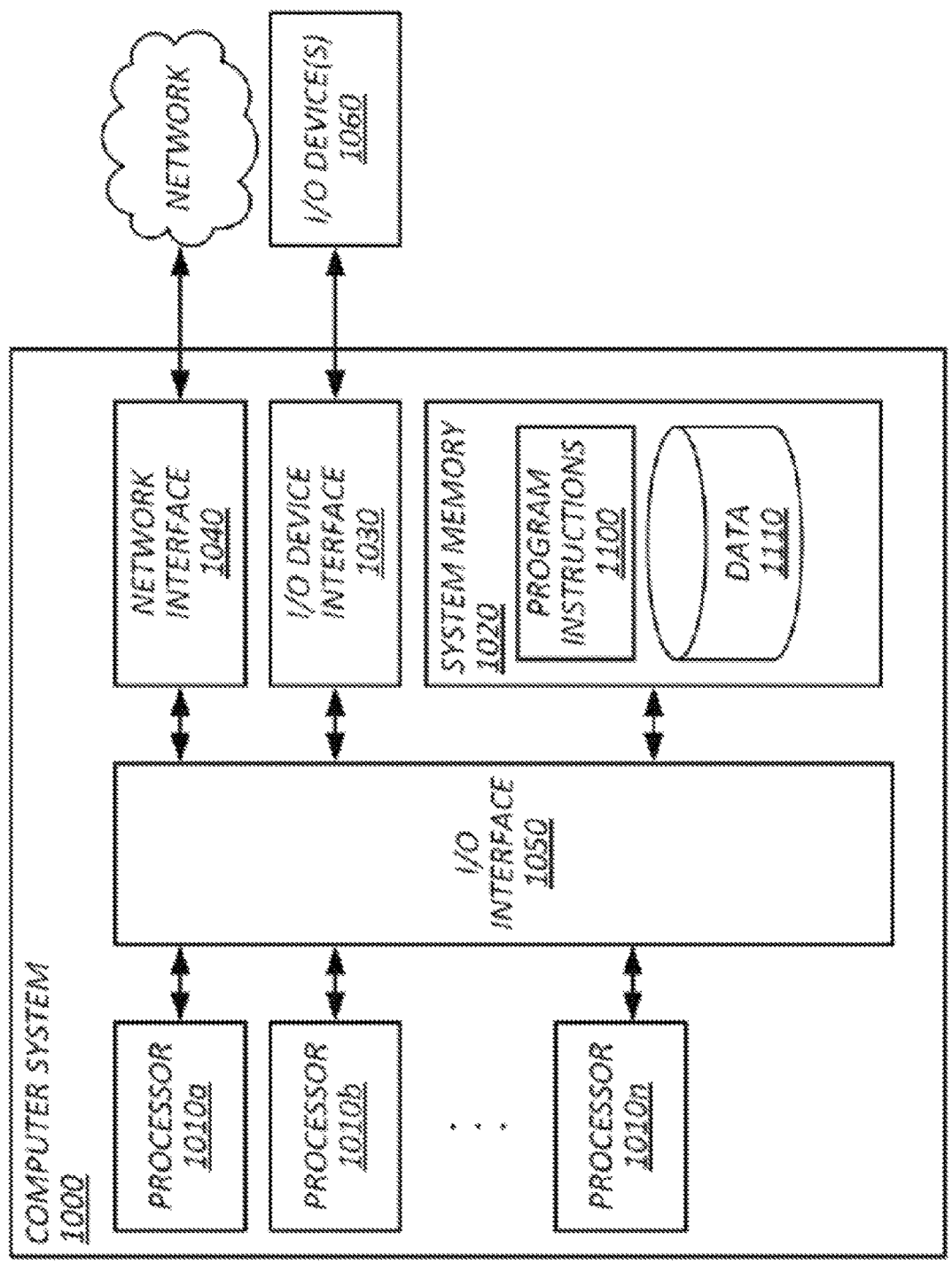
FIG. 4 is a block diagram showing an example of a computing device by which the present techniques may be implemented.

FIG. 4 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A computer-implemented method executed by one or more processors of a computing device that supports a client-side role in out-of-band authentication, the method comprising: obtaining an authentication application within a memory of a computing device; and executing, by the computing device, the authentication application within a client execution environment of the computing device, the authentication application when executed being configured to perform operations comprising: establishing one or more secure sessions with a trusted execution environment of the computing device, the trusted execution environment comprising a secure memory not accessible from the client execution environment; requesting, by one or more requests over one or more secure sessions, establishment of a set of credentials corresponding to a user of the computing device within the secure memory by a co-processor of the trusted execution environment, the co-processor being a different processor from a central processing unit of the computing device; requesting, by one or more requests over one or more secure sessions, first data comprising a representation of each credential in the set of credentials, first signed data, and a signature key of the trusted execution environment; determining the co-processor of the trusted execution environment generated the representations responsive to the signature key; in response to the determination, transmitting the first data and first signed data to a server; identifying, within the memory on the computing device, a notification requesting authentication of the user of the computing device; in response to the notification, requesting, by one or more requests over one or more secure sessions, second data comprising a representation of a credential in the set of credentials and second signed data, wherein the second data and the second signed data are received dependent upon authentication of the user based on the credential stored within the secure memory by the co-processor; and transmitting the second data and the second signed data to the server.

2. The computer-implemented method of embodiment 1, wherein: the one or more secure sessions are a single secure session tied to an identifier generated by the authentication application, the authentication application configured to provide the identifier to the trusted execution environment in association with a request for establishing the secure session; or each of at least a plurality of the one or more secure sessions is a different secure session.

3. The computer-implemented method of any one of embodiments 1-2, further comprising: generating, by the authentication application, an identifier; transmitting, by the authentication application in a request associated with establishing at least some of the one or more secure sessions, the identifier; receiving, by the authentication application from the trusted execution environment, a counter value in a response to a first one of the requests over the at least some of the one or more secure sessions; incrementing or decrementing, by the authentication application, the counter value; and including, in association with a next request over the at least some of the one or more secure sessions after the first one of the requests, the incremented or decremented counter value.

4. The computer-implement method of embodiment 3, further comprising: receiving, by the authentication application from the trusted execution environment, an instruction to establish a new secure session, wherein the instruction is received based on an incremented or decremented counter value provided in a request over the first secure session exceeding a threshold; generating, by the authentication application, a new identifier different from the first identifier; transmitting, by the authentication application in a request associated with establishing the new secure session, the new identifier; receiving, by the authentication application from the trusted execution environment, a new counter value in a response to a first one of the requests over the new secure session; and including, in association with a next request over the new secure session after the first one of the requests, an incremented or decremented counter value of the new counter value.

5. The computer-implemented method of embodiment 4, wherein the first secure session is tied to the first identifier by a first shared encryption key and the new secure session is tied to the second identifier by a second shared encryption key different from the first shared encryption key, the trusted execution environment non-responsive to requests using the first shared encryption key of the first secure session.

6. The computer-implemented method of any one of embodiments 1-5, wherein each credential in the set of credentials corresponds to a different credential and at least some of the different credentials are obtained from different corresponding components of the computing device, the authentication application configured to cause the trusted execution environment to obtain, in the secure memory, credential values for respective credentials from respective components.

7. The computer-implemented method of any one of embodiments 1-6, wherein a representation of a credential in the set of credentials is an output of a function that takes credential values and some other value as input to generate the representation.

8. The computer-implemented method of embodiment 7, wherein the other value is altered for a same credential value used for different sets of credentials, the different sets of credentials corresponding to different parties relying on the server to authenticate the user.

9. The computer-implemented method of any one of embodiments 1-8, wherein the notification includes information identifying a relying party for which the authentication application requested establishment of the set of credentials within the secure memory, at least one request in response to the notification specifying a set of credentials from which to receive the representation in the second data.

10. The computer-implemented method of any one of embodiments 1-9, wherein the notification includes identifying information, the method further comprising: including, by the authentication application, in at least one request in response to the notification, the identifying information, wherein the second signed data is based at least in part on the identifying information, and wherein the second signed data is verified by the server based in part on the same identifying information.

11. The computer-implemented method of any one of embodiments 1-10, wherein the signed data is an output of a signature function, the signature function generating the signed data based on one or more of: the representation of the credential included in the second data; identifying information for the notification; or a private signature key corresponding to the signature key of the trusted execution environment, wherein the private signature key is held within the secure memory.

12. The computer-implemented method of any one of embodiments 1-11, further comprising: receiving, by the authentication application from the server, an instruction to reestablish the set of credentials; requesting, by one or more requests over a secure session, reestablishment of the set of credentials within the secure memory of the trusted execution environment; and requesting, by one or more requests over a secure session, third data comprising a new representation of each credential in the set of credentials and third signed data.

13. The computer-implemented method of embodiment 12, wherein the reestablishment of the set of credentials comprises a determination of a new value by the trusted execution environment for generating the new representations without altering values of credentials within the set of credentials.

14. The computer-implemented method of any one of embodiments 1-13, wherein the server is configured to determine an authentication result for the user of the computing device based on the second data and the second signed data, the notification corresponding to an access attempt of a secure asset by a client device different from the computing device, the access attempt determined by the server to be associated with the user of the computing device and granted or denied based on the result of the authentication.

15. The computer-implemented method of any one of embodiments 1-14, wherein transmitting the first data and first signed data to the server further comprises transmitting the signature key of the trusted execution environment to the server, an authentication result for the notification determined by the server based on the representation of the credential in the second data matching a corresponding representation of the credential received in the first data and verification of the second data as being generated by the trusted execution environment based on the second data, the second signed data, and the signature key.

16. A computer-implemented method, executed by a processor of a server that supports a client-side role in out-of-band authentication based on a secure channel to a trusted execution environment on a first device different from a second device requesting access to a secure asset, the method comprising: registering the first device having a trusted execution environment, the registering comprising: establishing a user record associated with a user permitted to access the secure asset, the user record comprising a user identifier associated with the user; and establishing, in association with the user record, a device record for the first device in response to receiving, from the first device, a set of representations corresponding to a set of credentials stored within the trusted execution environment on the first device, device information including a device identifier of the first device, and a signature key corresponding to the trusted execution environment; receiving information corresponding to attempt to access the secure asset from the second device, the information comprising the user identifier and device information for the second device; accessing the user record based on the user identifier; selecting the device record for the first device associated with the user record based on the first device having a trusted execution environment; transmitting a notification to the first device based on the device identifier stored within the device record for the first device; receiving, from the first device, a response to the notification, the response including data comprising a representation of a credential in the set of representations corresponding to the set of credentials stored within the trusted execution environment on the first device and signed data; verifying the representation of the credential received in response to the notification matches the stored representation in the device record of the first device and the data was generated by the trusted execution environment based on the data, the signed data, and the signature key corresponding to the trusted execution environment; and transmitting, based on the verifying, an authentication result to grant the access attempt by the second device.

17. The computer-implemented method of embodiment 16, wherein multiple user records are associated with the user, the method further comprising: registering the first device for a plurality of different relying parties associated with different secure assets; establishing different user records for different relying parties, each different user record for the user storing a different set of representations specific to the corresponding relying party, wherein at least some of the representations in the different sets across the different user records correspond to same credential values input by the user on the first device and the at least some of the representations each have different values; and generating the notification prior to transmission, the generated notification including identifying information configured to cause the first device to select representations of credentials associated with the user record associated with the relying party associated with the secure asset.

18. The computer-implemented method of embodiment 16, wherein multiple user records are associated with the user, the method further comprising: registering the first device for a plurality of different relying parties associated with different secure assets; establishing different user records for different relying parties, each different user record for the user storing a different set of representations specific to the corresponding relying party, wherein at least some of the representations in the different sets across the different user records correspond to same credential values input by the user on the first device and the at least some of the representations each have different values; generating the notification prior to transmission, the generated notification including identifying data configured to cause the first device to select representations of credentials associated with the user record associated with the relying party associated with the secure asset and wherein the response to the notification comprises data identifying the notification; identifying the transmitted notification based on the identifying data; and verifying the representation of the credential received in the response corresponds to a requested credential in the transmitted notification and matches the stored representation corresponding to the requested credential for the user record associated with the relying party associated with the secure asset, and wherein the signed data is based at least in part on the data identifying the notification.

19. A tangible, non-transitory, machine readable medium storing instructions that when executed by a computing device effectuate operations comprising: the operations of any one of embodiments 1-18.

20. A system, comprising: a plurality of processors; and memory storing instructions that when executed by at least some of the processors effectuate operations comprising: the operations of any one of embodiments 1-18.

What is claimed is:

1. A tangible, non-transitory, machine readable medium storing instructions that when executed by a computing device effectuate operations comprising:

obtaining an authentication application within a memory of a computing device; and executing, by the computing device, the authentication application within a client execution environment of the computing device, the authentication application when executed being configured to perform operations comprising:

establishing one or more secure sessions with a trusted execution environment of the computing device over which the authentication application communicates requests to the trusted execution environment, the trusted execution environment comprising a secure memory not accessible from the client execution environment;

requesting, over one or more of the secure sessions, establishment of a set of credentials corresponding to a given user of the computing device within the secure memory by a co-processor of the trusted execution environment, the co-processor being a different processor from a central processing unit of the computing device;

requesting, over one or more of the secure sessions after at least some credentials in the set of credentials corresponding to the given user are established, first data comprising a representation of each of the at least some credentials in the set of credentials corresponding to the given user, first signed data, and a signature key of the trusted execution environment;

determining whether the co-processor of the trusted execution environment generated the representation of each of the at least some credentials in the set of credentials corresponding to the given user, the determination being responsive to the signature key;

in response to the determination, sending, via a network, the first data and the first signed data to a server system;

accessing, within the memory other than the secure memory on the computing device, information from a notification requesting authentication of the given user of the computing device, the notification being received after sending the first data and the first signed data to the server system, the notification being saved within the memory other than the secure memory on the computing device;

in response to the notification, requesting, over one or more of the secure sessions, second data comprising the representation of a given credential from the at least some credentials in the set of credentials and second signed data, wherein the second data and the second signed data are received dependent upon authentication of the given user by the co-processor of the trusted execution environment, and wherein the authentication of the given user is based on the given credential stored within the secure memory by the co-processor; and sending the second data and the second signed data to the server system.

2. The non-transitory machine readable medium of claim 1, wherein:

the one or more secure sessions by which the set of credentials corresponding to the given user are established comprises a first secure session tied to an identifier generated by the authentication application, wherein:

the authentication application is configured to provide the identifier to the trusted execution environment in association with a request for establishing the first secure session, and the identifier distinguishes the single secured session from other secured sessions; or each of at least a plurality of the one or more secure sessions by which at least some of the credentials in the set of credentials are established is a different secure session.

3. The non-transitory machine readable medium of claim 1, the operations further comprising:

generating, by the authentication application, an identifier;

transmitting, by the authentication application in a request associated with establishing a first secure session in the one or more secure sessions, the identifier;

receiving, by the authentication application from the trusted execution environment, a value corresponding to the first secure session in the one or more secure sessions;

incrementing or decrementing, by the authentication application, the value; and including, in association with a next request over the first secure session or a later one of the secure sessions after receiving the value, the incremented or decremented value.

4. The non-transitory machine readable medium of claim 3, wherein:

the value is a counter value; and
the operations further comprise:

receiving, by the authentication application from the trusted execution environment, an instruction to establish a new secure session, wherein the instruction is received based on an incremented or decremented value included in a request over the first secure session exceeding a threshold;

generating, by the authentication application, a new identifier different from the first identifier;

transmitting, by the authentication application in a request associated with establishing the new secure session, the new identifier;

receiving, by the authentication application from the trusted execution environment, a new counter value corresponding to the new secure session; and including, in association with a next request over the new secure session after receiving the new counter value, an incremented or decremented counter value of the new counter value.

5. The non-transitory machine readable medium of claim 4, wherein the given one of the secure sessions is tied to the first identifier by a first shared encryption key and the new secure session is tied to the second identifier by a second shared encryption key different from the first shared encryption key, the trusted execution environment being non-responsive to requests using the first shared encryption key of the first secure session after establishment of the second shared encryption key.

6. The non-transitory machine readable medium of claim 1, wherein each credential in the set of credentials corresponds to a different credential and at least some of the different credentials are obtained from different corresponding components of the computing device, the authentication application being configured to cause the trusted execution environment to obtain, in the secure memory, credential values for respective credentials from respective components.

7. The non-transitory machine readable medium of claim 1, wherein a representation of a credential in the set of credentials is an output of a function that takes credential values of the credential as input to generate the representation.

8. The non-transitory machine readable medium of claim 7, wherein the function takes the credential values of the credential and a second value as input to generate the representation, the second value being altered for different sets of credentials, the different sets of credentials corresponding to different parties relying on the server to authenticate the given user.

9. The non-transitory machine readable medium of claim 1, wherein the notification includes information identifying a relying party for which the authentication application requested establishment of the set of credentials within the secure memory, at least one request in response to the notification specifying a set of credentials from which to receive the representation in the second data.

10. The non-transitory machine readable medium of claim 1, wherein the notification includes identifying information, the method further comprising:

including, by the authentication application, in at least one request in response to the notification, the identifying information, wherein the second signed data is based at least in part on the identifying information, and wherein the second signed data is verified by the server based in part on the same identifying information.

11. The non-transitory machine readable medium of claim 1, wherein the first signed data and the second signed data correspond to respective outputs of a signature function, the signature function generating the second signed data based on one or more of:

the representation of the given credential included in the second data;

identifying information for the notification; or a private signature key corresponding to the signature key of the trusted execution environment, wherein the private signature key is held within the secure memory and is not held outside the secure memory.

12. The non-transitory machine readable medium of claim 1, further comprising:

receiving, by the authentication application from the server system, an instruction to reestablish the set of credentials;

in response to the instruction to reestablish the set of credentials, requesting, over one or more of the secure sessions, reestablishment of the set of credentials within the secure memory of the trusted execution environment; and obtaining third data comprising a new representation of each of the at least some credentials previously established in the set of credentials and third signed data.

13. The non-transitory machine readable medium of claim 12, wherein the reestablishment of the set of credentials comprises a determination of a new value by the trusted execution environment for generating the new representations without altering values of credentials within the set of credentials.

14. The non-transitory machine readable medium of claim 1, wherein the server is configured to determine an authentication result for the given user of the computing device based on the second data and the second signed data, the notification corresponding to an access attempt of a secure asset by a client device different from the computing device, the access attempt determined by the server to be associated with the user of the computing device and granted or denied based on the result of the authentication.

15. The non-transitory machine readable medium of claim 1, wherein transmitting the first data and first signed data to the server further comprises transmitting the signature key of the trusted execution environment to the server, an authentication result for the notification determined by the server based on the representation of the credential in the second data matching a corresponding representation of the credential received in the first data and verification of the second data as being generated by the trusted execution environment based on the second data, the second signed data, and the signature key.

16. The non-transitory machine readable medium of claim 1, the operations comprising:
steps for establishing a secure session.

17. The non-transitory machine readable medium of claim 1, wherein the computing device comprises means for providing a trusted execution environment.

18. A computer-implemented method executed by one or more processors of a computing device that supports a client-side role in out-of-band authentication, the method comprising:

obtaining an authentication application within a memory of a computing device; and executing, by the computing device, the authentication application within a client execution environment of the computing device, the authentication application when executed being configured to perform operations comprising:

establishing one or more secure sessions with a trusted execution environment of the computing device over which the authentication application communicates with the trusted execution environment, the trusted execution environment comprising a secure memory not accessible from the client execution environment other than via secure sessions;

requesting in a first request, over a first one of the secure sessions, establishment of a set of credentials corresponding to a given user of the computing device within the secure memory by a co-processor of the trusted execution environment, the co-processor being a different processor from a central processing unit of the computing device;

obtaining, over a second one of the secure sessions after at least some credentials in the set of credentials corresponding to the given user are established, first data comprising & respective representations of each of the at least some credentials in the set of credentials, respective representations corresponding to the given user, first signed data, and a signature key of the trusted execution environment, the signature key being a public key of a public/private cryptographic key pair having a private key retained by the trusted execution environment;

determining whether the co-processor of the trusted execution environment generated all of the representations, the determination being responsive to the signature key of the trusted execution environment to which the representations correspond;

in response to the determination, sending, via a network, the first data and the first signed data to a server system;

accessing, within the memory other than the secure memory on the computing device, information from a notification requesting authentication of the given user of the computing device, the notification being received after sending the first data and the first signed data to the server system, and the notification being stored within the memory other than the secure memory on the computing device, the memory other than the secure memory on the computing device having a different memory address bus relative to the secure memory;

in response to the notification, requesting in a second request, over a third one of the secure sessions, second data comprising the representation of a given credential from the at least some credentials in the set of credentials and second signed data, wherein the second data and the second signed data are received dependent upon authentication of the given user by the co-processor of the trusted execution environment, and wherein the authentication of the given user is based on the given credential stored within the secure memory by the co-processor; and sending the second data and the second signed data to the server system.

19. A computer-implemented method, executed by a server-side computing system that supports a client-side role in out-of-band authentication based on a secure channel to a trusted execution environment on a first device different from a second device requesting access to a secure asset, the method comprising:

registering the first device having a trusted execution environment, the registering comprising:

establishing a user record associated with a user permitted to access the secure asset, the user record comprising a user identifier associated with the user; and establishing, in association with the user record, a device record for the first device in response to receiving, from the first device, a set of representations corresponding to a set of credentials stored within the trusted execution environment on the first device, device information including a device identifier of the first device, and a signature key corresponding to the trusted execution environment;

receiving information corresponding to an attempt to access the secure asset from the second device, the received information comprising the user identifier and device information of the second device;

identifying the user record associated with the user based on the user identifier;

selecting the device record for the first device associated with the user record, the device record for the first device being selected based on the first device having a trusted execution environment;

transmitting a notification to the first device based on the device identifier stored within the device record for the first device, the notification requesting approval of the attempt to access the secure asset;

receiving, from the first device, a response to the notification the response including data comprising a representation of a credential, the representation in the set of representations corresponding to the set of credentials stored within the trusted execution environment on the first device and signed data;

determining an authentication result by verifying the representation of the credential received in the response to the notification, wherein verifying the representation comprises matching the representation with the stored representation in the device record of the first device and verifying that the data was generated by the trusted execution environment based on the data, the signed data, and the signature key corresponding to the trusted execution environment; and transmitting the authentication result to grant the access attempt by the second device.

20. The computer-implemented method of claim 19, wherein multiple user records are associated with the user, the method further comprising:

registering the first device for a plurality of different relying parties associated with different secure assets;

establishing different user records for different relying parties, each different user record for the user storing a different set of representations specific to a corresponding relying party, wherein at least some of the representations in the different sets across the different user records correspond to same credential values input by the user on the first device and the at least some of the representations each have different values; and generating the notification prior to transmission, the generated notification including identifying information configured to cause the first device to select representations of credentials associated with the user record associated with the relying party associated with the secure asset.

21. The computer-implemented method of claim 19, wherein multiple user records are associated with the user, the method further comprising:

registering the first device for a plurality of different relying parties associated with different secure assets;

establishing different user records for different relying parties, each different user record for the user storing a different set of representations specific to a corresponding relying party, wherein at least some of the representations in the different sets across the different user records correspond to same credential values input by the user on the first device and the at least some of the representations each have different values;

generating the notification prior to transmission, the generated notification including identifying data configured to cause the first device to select representations of credentials associated with the user record associated with the relying party associated with the secure asset and wherein the response to the notification comprises data identifying the notification;

identifying the transmitted notification based on the identifying data; and verifying the representation of the credential received in the response corresponds to a requested credential in the transmitted notification and matches the stored representation corresponding to the requested credential for the user record associated with the relying party associated with the secure asset, and wherein the signed data is based at least in part on the data identifying the notification.

* * * * *